US012032323B2

(12) United States Patent
Kusano et al.

(10) Patent No.: US 12,032,323 B2
(45) Date of Patent: Jul. 9, 2024

(54) IMAGE FORMING APPARATUS AND PROCESS CARTRIDGE

(71) Applicant: FUJIFILM Business Innovation Corp., Tokyo (JP)

(72) Inventors: Keisuke Kusano, Kanagawa (JP); Wataru Yamada, Kanagawa (JP); Masahiro Iwasaki, Kanagawa (JP); Akihiro Kawasaki, Kanagawa (JP); Yuki Oyamada, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/180,902

(22) Filed: Mar. 9, 2023

(65) Prior Publication Data

US 2024/0118653 A1 Apr. 11, 2024

(30) Foreign Application Priority Data

Sep. 26, 2022 (JP) ................................. 2022-153017

(51) Int. Cl.
*G03G 21/08* (2006.01)
*G03G 15/00* (2006.01)
(Continued)

(52) U.S. Cl.
CPC ............. *G03G 21/08* (2013.01); *G03G 15/75* (2013.01); *G03G 15/751* (2013.01);
(Continued)

(58) Field of Classification Search
CPC .... G03G 15/75; G03G 15/751; G03G 15/752; G03G 15/754; G03G 21/0094;
(Continued)

(56) References Cited

U.S. PATENT DOCUMENTS

2010/0290807 A1* 11/2010 Shimoyama ........... G03G 15/75 430/58.75
2011/0243609 A1* 10/2011 Takami .................. G03G 21/08 399/128
2021/0088918 A1* 3/2021 Kusano ............. G03G 5/14726

FOREIGN PATENT DOCUMENTS

JP 04-20507 A 1/1992
JP 2001-305761 A 11/2001
(Continued)

*Primary Examiner* — Joseph S Wong
(74) *Attorney, Agent, or Firm* — Sughrue Mion, PLLC

(57) ABSTRACT

An image forming apparatus includes an electrophotographic photoreceptor that includes a conductive substrate and a photosensitive layer disposed on the conductive substrate, the electrophotographic photoreceptor having an outermost surface layer that contains a binder resin, a charge-transporting material, and a fluorine-containing resin particle, the fluorine-containing resin particle containing 0 or more and 30 or less carboxy groups per $10^6$ carbon atoms, a charging device that charges the electrophotographic photoreceptor, an electrostatic latent image forming device that forms an electrostatic latent image on the electrophotographic photoreceptor that is charged, a developing device that houses a developer containing a toner and that develops, with the developer, the electrostatic latent image formed on the electrophotographic photoreceptor into a toner image, a transfer device that transfers the toner image onto a transfer-receiving medium, and an optical discharging device that, after the toner image is transferred onto the transfer-receiving medium and before the electrophotographic photoreceptor is charged, irradiates the electrophotographic photoreceptor with discharging light with a light quantity of 1.0 μW or more and 50.0 μW or less to perform discharging.

10 Claims, 3 Drawing Sheets

(51) Int. Cl.

| | |
|---|---|
| ***G03G 15/01*** | (2006.01) |
| ***G03G 15/02*** | (2006.01) |
| ***G03G 15/04*** | (2006.01) |
| ***G03G 15/16*** | (2006.01) |
| ***G03G 21/00*** | (2006.01) |
| ***G03G 21/06*** | (2006.01) |
| *G03G 9/087* | (2006.01) |

(52) U.S. Cl.
CPC ......... *G03G 15/752* (2013.01); *G03G 15/754* (2013.01); *G03G 21/0094* (2013.01); *G03G 21/06* (2013.01); *G03G 9/0872* (2013.01); *G03G 15/0121* (2013.01); *G03G 15/0233* (2013.01); *G03G 15/04036* (2013.01); *G03G 15/1685* (2013.01); *G03G 15/6597* (2013.01); *G03G 2215/00957* (2013.01)

(58) Field of Classification Search
CPC ................... G03G 21/06; G03G 21/08; G03G 2215/00957; G03G 15/6597; G03G 15/0121; G03G 15/0233; G03G 15/04036; G03G 15/1685; G03G 9/0872
See application file for complete search history.

(56) References Cited

FOREIGN PATENT DOCUMENTS

| | | | |
|---|---|---|---|
| JP | 2005-326474 | A | 11/2005 |
| JP | 2019-218539 | A | 12/2019 |
| JP | 2020-128521 | A | 8/2020 |

* cited by examiner

IMAGE FORMING APPARATUS AND PROCESS CARTRIDGE

CROSS-REFERENCE TO RELATED APPLICATIONS

This application is based on and claims priority under 35 USC 119 from Japanese Patent Application No. 2022-153017 filed Sep. 26, 2022.

BACKGROUND

(i) Technical Field

The present disclosure relates to an image forming apparatus and a process cartridge.

(ii) Related Art

In existing electrophotographic image forming apparatuses, a toner image formed on the surface of an electrophotographic photoreceptor through processes of charging, exposure, development, and transfer is transferred onto a recording medium.

Japanese Unexamined Patent Application Publication No. 2001-305761 discloses "an electrophotographic photoreceptor in which a layer containing at least a pH buffering agent and wear-resistant particles is disposed on a conductive support; an electrophotographic method including repeatedly performing at least charging, image exposure, development, transfer cleaning, and discharging on the electrophotographic photoreceptor; an electrophotographic apparatus having the electrophotographic photoreceptor and including at least a charging unit, an image exposure unit, a developing unit, a transfer unit, a cleaning unit, and a discharging unit; and a process cartridge for an electrophotographic apparatus, the process cartridge having the electrophotographic photoreceptor and being detachably attachable to an apparatus body that includes at least a charging unit, an image exposure unit, a developing unit, a transfer unit, a cleaning unit, and a discharging unit".

Japanese Unexamined Patent Application Publication No. 2005-326474 discloses "an electrophotographic apparatus including an electrophotographic photoreceptor, a charging unit, an image exposure unit, a developing unit, and a transfer unit". Japanese Unexamined Patent Application Publication No. 2005-326474 also discloses "a method for producing an electrophotographic photoreceptor, the method including forming a protective layer using a coating material for a protective layer, the coating material containing a thermosetting phenolic resin and an acid and containing at least a filler or a charge-transporting substance, and performing heat treatment at a temperature equal to or higher than the boiling point or the sublimation point of the acid", and discloses that "an image forming apparatus includes a discharging unit that discharges a photoreceptor".

Japanese Unexamined Patent Application Publication No. 2019-218539 discloses "an electrophotographic photoreceptor having an outermost surface layer that contains dispersant-adhering polytetrafluoroethylene particles, the particles having surfaces to which a dispersant having a fluorine atom adheres and having a perfluorooctanoic acid content of 0 ppb or more and 25 ppb or less relative to polytetrafluoroethylene particles".

Japanese Unexamined Patent Application Publication No. 2020-128521 discloses "an electrophotographic photoreceptor having an outermost surface layer that contains fluorine-containing resin particles containing 0 or more and 30 or less carboxy groups per $10^6$ carbon atoms and containing a basic compound in an amount of 0 ppm or more and 3 ppm or less".

SUMMARY

Aspects of non-limiting embodiments of the present disclosure relate to an image forming apparatus including a photoreceptor that includes a conductive substrate and a photosensitive layer disposed on the conductive substrate, the photoreceptor having an outermost surface layer that contains a binder resin, a charge-transporting material, and fluorine-containing resin particles, the fluorine-containing resin particles containing 0 or more and 30 or less carboxy groups per $10^6$ carbon atoms; a charging device that charges the photoreceptor; an electrostatic latent image forming device that forms an electrostatic latent image on the photoreceptor that is charged; a developing device that houses a developer containing a toner and that develops, with the developer, the electrostatic latent image formed on the photoreceptor into a toner image; a transfer device that transfers the toner image onto a transfer-receiving medium; and an optical discharging device that, after the toner image is transferred onto the transfer-receiving medium and before the photoreceptor is charged, irradiates the photoreceptor with discharging light to perform discharging, in which good potential retainability and image density retainability of the photoreceptor are exhibited compared with the case where a light quantity of discharging light is less than 1.0 μW or more than 50.0 μW.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus comprising an electrophotographic photoreceptor that includes a conductive substrate and a photosensitive layer disposed on the conductive substrate, the electrophotographic photoreceptor having an outermost surface layer that contains a binder resin, a charge-transporting material, and a fluorine-containing resin particle, the fluorine-containing resin particle containing 0 or more and 30 or less carboxy groups per $10^6$ carbon atoms; a charging device that charges the electrophotographic photoreceptor; an electrostatic latent image forming device that forms an electrostatic latent image on the electrophotographic photoreceptor that is charged; a developing device that houses a developer containing a toner and that develops, with the developer, the electrostatic latent image formed on the electrophotographic photoreceptor into a toner image; a transfer device that transfers the toner image onto a transfer-receiving medium; and an optical discharging device that, after the toner image is transferred onto the transfer-receiving medium and before the electrophotographic photoreceptor is charged, irradiates the electrophotographic photoreceptor with discharging light with a light quantity of 1.0 μW or more and 50.0 μW or less to perform discharging.

BRIEF DESCRIPTION OF THE DRAWINGS

Exemplary embodiments of the present disclosure will be described in detail based on the following figures, wherein.

DETAILED DESCRIPTION

Figure 1:
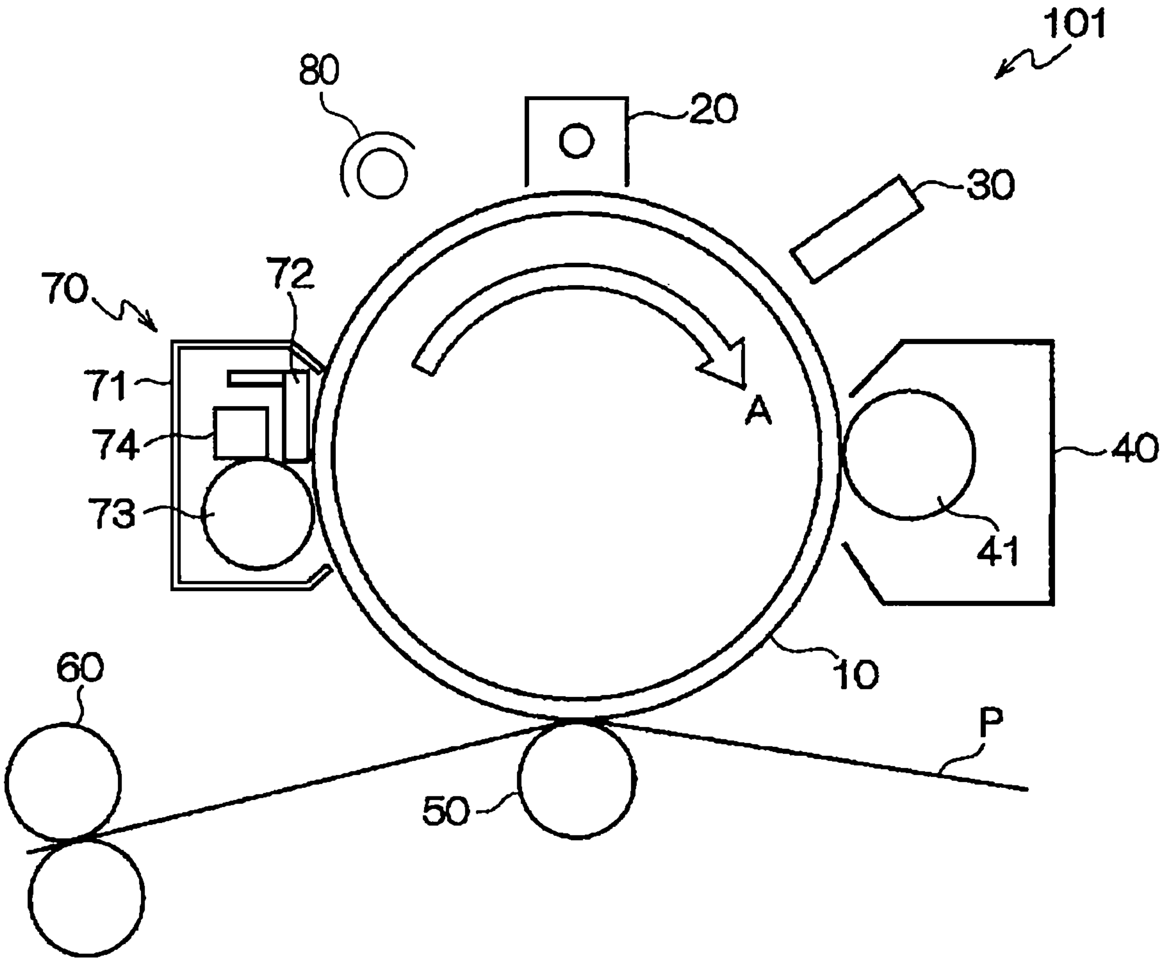
FIG. 1 is a schematic diagram illustrating an image forming apparatus according to an exemplary embodiment.

Exemplary embodiments of the present disclosure will be described below. The following description and examples are illustrative of the exemplary embodiments and are not intended to limit the scope of the present disclosure.

In numerical ranges described in a stepwise manner in the present specification, an upper limit or a lower limit of one numerical range may be replaced with an upper limit or a lower limit of another numerical range described in a stepwise manner. In a numerical range described in the present specification, an upper limit or a lower limit of the numerical range may be replaced with a value described in an example.

Each component may contain two or more corresponding substances.

When the amount of a component in a composition is described and there are two or more substances corresponding to the component in the composition, the amount of the component is the total amount of the two or more substances contained in the composition unless otherwise noted.

In the present specification, an "electrophotographic photoreceptor" is also referred to as a "photoreceptor".

Image Forming Apparatus

An image forming apparatus according to an exemplary embodiment includes an electrophotographic photoreceptor that includes a conductive substrate and a photosensitive layer disposed on the conductive substrate, the electrophotographic photoreceptor having an outermost surface layer containing a binder resin, a charge-transporting material, and fluorine-containing resin particles, and that satisfies one of conditions (1) and (2) below; a charging device that charges the electrophotographic photoreceptor; an electrostatic latent image forming device that forms an electrostatic latent image on the electrophotographic photoreceptor that is charged; a developing device that houses a developer containing a toner and that develops, with the developer, the electrostatic latent image formed on the electrophotographic photoreceptor into a toner image; a transfer device that transfers the toner image onto a transfer-receiving medium; and an optical discharging device that, after the toner image is transferred onto the transfer-receiving medium and before the electrophotographic photoreceptor is charged, irradiates the electrophotographic photoreceptor with discharging light with a light quantity of 1.0 μW or more and 50.0 μW or less to perform discharging.

Condition 1: The number of carboxy groups contained in the fluorine-containing resin particles is 0 or more and 30 or less per $10^6$ carbon atoms.

Condition 2: The content of perfluorooctanoic acid (hereinafter also referred to as "PFOA") contained in the fluorine-containing resin particles is 0 ppb or more and 25 ppb or less relative to the fluorine-containing resin particles.

With the above configuration, the image forming apparatus according to the exemplary embodiment exhibits good potential retainability and image density retainability of the photoreceptor. The reason for this is supposed as follows.

In the related art, in order to improve wear resistance of a photoreceptor, fluorine-containing resin particles are contained in an outermost surface layer to improve lubricity of the outermost surface layer, thereby ensuring wear resistance of the outermost surface layer.

Meanwhile, fluorine-containing resin particles also affect electrical properties of the photoreceptor. Specifically, adopting ordinary fluorine-containing resin particles degrades chargeability. To reliably achieve good chargeability, fluorine-containing resin particles having a reduced number of carboxy groups or a reduced PFOA content may be used.

However, if fluorine-containing resin particles having a reduced number of carboxy groups or a reduced PFOA content are used, the outermost surface layer of the photoreceptor has a high film resistance, and the accumulation of charges tends to occur.

Therefore, in an apparatus including a discharging device that discharges the photoreceptor by irradiation with discharging light, the energization charge amount for the photoreceptor is increased, and many charges are accumulated on the photoreceptor compared with an apparatus that does not include a discharging device. As a result, the residual potential increases, and the potential of the photoreceptor is less likely to be retained.

In view of this, in the image forming apparatus according to the exemplary embodiment, while the image density retainability is ensured by setting the light quantity of discharging light to 1.0 μW or more, the energization charge amount is reduced by setting the light quantity of discharging light to 50.0 μW or less to suppress an increase in the residual potential. As a result, the photoreceptor exhibits good potential retainability together with good image density retainability.

Accordingly, with the configuration described above, the image forming apparatus according to the exemplary embodiment is supposed to have good potential retainability and image density retainability.

The image forming apparatus according to the exemplary embodiment may be applied to any of various well-known image forming apparatuses such as: an apparatus including a fixing device that fixes a toner image transferred onto the surface of a recording medium; a direct transfer-type apparatus that transfers a toner image formed on the surface of an electrophotographic photoreceptor directly onto a recording medium; an intermediate transfer-type apparatus that first-transfers a toner image formed on the surface of an electrophotographic photoreceptor onto the surface of an intermediate transfer body and then second-transfers the toner image transferred onto the surface of the intermediate transfer body onto the surface of a recording medium; an apparatus including a cleaning device that cleans the surface of an electrophotographic photoreceptor after transfer of a toner image and before charging; an apparatus including a discharging device that, after transfer of a toner image and before charging, irradiates the surface of an electrophotographic photoreceptor with discharging light to perform discharging; and an apparatus including an electrophotographic photoreceptor heating member that increases the temperature of an electrophotographic photoreceptor to reduce the relative difference in temperature.

In the intermediate transfer-type apparatus, the transfer device is configured to include, for example, an intermediate transfer body having a surface onto which a toner image is to be transferred, a first transfer device that first-transfers the toner image formed on the surface of an electrophotographic photoreceptor onto the surface of the intermediate transfer body, and a second transfer device that second-transfers the toner image transferred onto the surface of the intermediate transfer body onto the surface of a recording medium.

The image forming apparatus according to the exemplary embodiment may be an image forming apparatus with a dry development system or an image forming apparatus with a wet development system (development system using a liquid developer).

In the image forming apparatus according to the exemplary embodiment, for example, a part that includes the electrophotographic photoreceptor and the discharging device may have a cartridge structure (process cartridge) attached to and detached from the image forming apparatus. The process cartridge used may be, for example, a process cartridge including the photoreceptor and the discharging device. The process cartridge may include, in addition to the photoreceptor and the discharging device, for example, at least one selected from the group consisting of the charging device, the electrostatic latent image forming device, the developing device, and the transfer device.

Hereinafter, an image forming apparatus according to the exemplary embodiment will be described in detail with reference to the drawings.

An exemplary embodiment in which an electrophotographic photoreceptor satisfies both the above conditions (1) and (2) will be described below; however, it is sufficient that the electrophotographic photoreceptor satisfies at least one of the conditions (1) and (2).

FIG. 1 is a schematic diagram illustrating an image forming apparatus according to the exemplary embodiment.

As illustrated in FIG. 1, an image forming apparatus 101 according to the exemplary embodiment includes, for example, an electrophotographic photoreceptor 10 (one example of the electrophotographic photoreceptor) that rotates in the clockwise direction as indicated by the arrow A; a charging device 20 (one example of the charging device) that is disposed above the electrophotographic photoreceptor 10 so as to face the electrophotographic photoreceptor 10 and that charges the surface of the electrophotographic photoreceptor 10; an exposure device 30 (one example of the electrostatic latent image forming device) that exposes the surface of the electrophotographic photoreceptor 10 charged by the charging device 20 to light to form an electrostatic latent image; a developing device 40 (one example of the developing device) that attaches a toner contained in a developer to the electrostatic latent image formed by the exposure device 30 to form a toner image on the surface of the electrophotographic photoreceptor 10; a transfer device 50 (one example of the transfer device) that charges a recording sheet P (one example of the transfer-receiving medium) in the polarity different from the charging polarity of the toner to transfer the toner image on the electrophotographic photoreceptor 10 onto the recording sheet P; a cleaning device 70 that cleans the surface of the electrophotographic photoreceptor 10; and an optical discharging device 80 (one example of the optical discharging device) that, after the toner image is transferred onto the recording sheet P by the transfer device 50 and before the surface of the electrophotographic photoreceptor 10 is charged by the charging device 20, irradiates the surface of the electrophotographic photoreceptor 10 with discharging light to perform discharging. The image forming apparatus 101 according to the exemplary embodiment includes a fixing device 60 that fixes the toner image while transporting the recording sheet P on which the toner image is formed.

Details of components of the image forming apparatus 101 according to the exemplary embodiment will now be described.

Electrophotographic Photoreceptor

An electrophotographic photoreceptor according to the exemplary embodiment will be described below with reference to the drawing.

Figure 2:
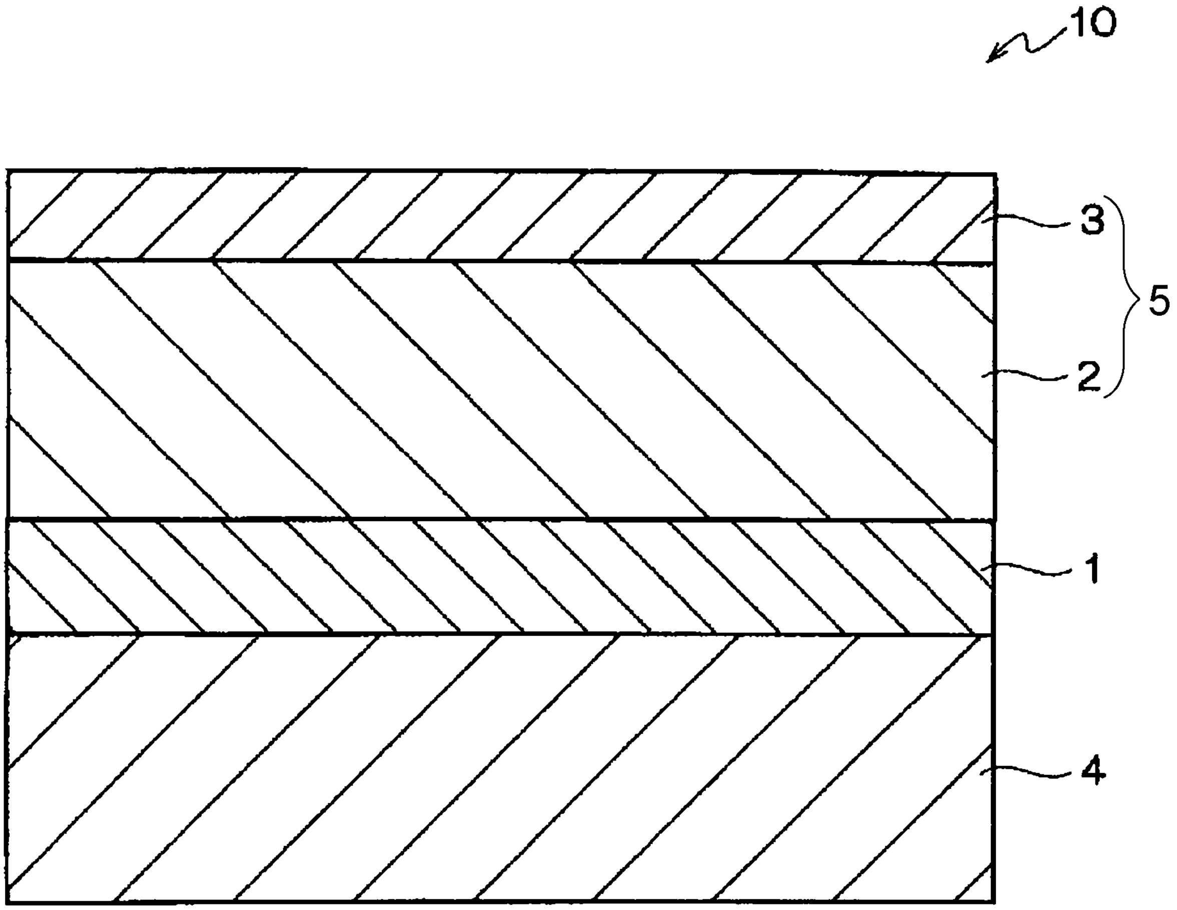
FIG. 2 is a schematic partial sectional view illustrating an electrophotographic photoreceptor according to an exemplary embodiment.

An electrophotographic photoreceptor 10 illustrated in FIG. 2 is, for example, a photoreceptor 10 having a structure in which an undercoat layer 1, a charge generation layer 2, and a charge transport layer 3 are stacked on a conductive substrate 4 in this order. The charge generation layer 2 and the charge transport layer 3 constitute a photosensitive layer 5. The charge transport layer 3 constitutes the outermost surface layer.

The electrophotographic photoreceptor 10 may have a layer structure that does not include the undercoat layer 1.

The electrophotographic photoreceptor 10 may be a photoreceptor having a single-layer-type photosensitive layer in which the functions of the charge generation layer 2 and the charge transport layer 3 are integrated. In the case of a photoreceptor having a single-layer-type photosensitive layer, the single-layer-type photosensitive layer constitutes the outermost surface layer.

Each of the layers of the electrophotographic photoreceptor will be described in detail below. In the description below, reference signs are omitted.

Conductive Substrate

Examples of the conductive substrate include metal plates, metal drums, and metal belts that contain a metal (such as aluminum, copper, zinc, chromium, nickel, molybdenum, vanadium, indium, gold, or platinum) or an alloy (such as stainless steel). Examples of the conductive substrate further include paper sheets, resin films, and belts coated, vapor-deposited, or laminated with a conductive compound (for example, a conductive polymer or indium oxide), a metal (for example, aluminum, palladium, or gold), or an alloy. Herein, the term "conductive" means having a volume resistivity of less than $10^{13}$ Ω cm.

The surface of the conductive substrate may be roughened to have a center-line average roughness Ra of 0.04 μm or more and 0.5 μm or less in order to suppress interference fringes generated when the electrophotographic photoreceptor is used in a laser printer and is irradiated with a laser beam. When incoherent light is used as a light source, roughening of the surface for preventing interference fringes need not be necessarily performed; however, roughening of the surface suppresses generation of defects due to irregularities on the surface of the conductive substrate and thus is suitable for further extending the lifetime.

Examples of the method for roughening the surface include wet honing with which an abrasive suspended in water is sprayed onto a conductive substrate, centerless grinding with which a conductive substrate is pressed against a rotating grinding stone to perform continuous grinding, and anodic oxidation treatment.

Another example of the method for roughening the surface is a method that includes, instead of roughening the surface of a conductive substrate, dispersing a conductive or semi-conductive powder in a resin, and forming a layer of the resulting resin on the surface of a conductive substrate to form a surface roughened by the particles dispersed in the layer.

The surface roughening treatment by anodic oxidation includes forming an oxide film on the surface of a conductive substrate by anodizing, as the anode, a conductive substrate made of a metal (for example, aluminum) in an electrolyte solution. Examples of the electrolyte solution include a sulfuric acid solution and an oxalic acid solution. However, a porous anodized film formed by anodic oxidation is originally chemically active, is likely to be contaminated, and has a resistance that significantly varies depending on the environment. Thus, the porous anodized film may be subjected to a pore-sealing treatment in which fine pores in the oxide film are sealed by volume expansion caused by hydration reaction in pressurized water vapor or boiling water (a metal salt such as a nickel salt may be added) so as to convert the oxide into a more stable hydrous oxide.

The thickness of the anodized film is preferably, for example, 0.3 μm or more and 15 μm or less. When the film thickness is within this range, a barrier property against injection tends to be exhibited, and an increase in the residual potential caused by repeated use tends to be suppressed.

The conductive substrate may be subjected to a treatment with an acidic treatment solution or a Boehmite treatment.

The treatment with an acidic treatment solution is conducted, for example, as follows. First, an acidic treatment solution containing phosphoric acid, chromic acid, and hydrofluoric acid is prepared. Regarding the blend ratio of phosphoric acid, chromic acid, and hydrofluoric acid in the acidic treatment solution, for example, phosphoric acid may be in the range of from 10% by mass or more and 11% by mass or less, chromic acid may be in the range of from 3% by mass or more and 5% by mass or less, hydrofluoric acid may be in the range of from 0.5% by mass or more and 2% by mass or less, and the total concentration of these acids may be in the range of from 13.5% by mass or more and 18% by mass or less. The treatment temperature is preferably, for example, 42° C. or higher and 48° C. or lower. The resulting film preferably has a thickness of 0.3 μm or more and 15 μm or less.

The Boehmite treatment is conducted, for example, by immersing a conductive substrate in pure water at 90° C. or higher and 100° C. or lower for 5 minutes to 60 minutes or by bringing a conductive substrate into contact with heated water vapor at 90° C. or higher and 120° C. or lower for 5 minutes to 60 minutes. The resulting film preferably has a thickness of 0.1 μm or more and 5 μm or less. The conductive substrate after the Boehmite treatment may be further anodized by using an electrolyte solution having a low film solubility, such as a solution of adipic acid, boric acid, a borate, a phosphate, a phthalate, a maleate, a benzoate, a tartrate, or a citrate.

Undercoat Layer

The undercoat layer is, for example, a layer that contains inorganic particles and a binder resin.

Examples of the inorganic particles include inorganic particles having a powder resistance (volume resistivity) of $10^2$ Ω cm or more and $10^{11}$ Ω cm cm or less.

Of these, the inorganic particles having the above resistance value may be, for example, metal oxide particles such as tin oxide particles, titanium oxide particles, zinc oxide particles, or zirconium oxide particles, and zinc oxide particles are particularly preferred.

The specific surface area of the inorganic particles as measured by the BET method may be, for example, 10 $m^2$/g or more.

The volume-average particle diameter of the inorganic particles may be, for example, 50 nm or more and 2,000 nm or less (preferably 60 nm or more and 1,000 nm or less).

The content of the inorganic particles is, for example, preferably 10% by mass or more and 80% by mass or less, and more preferably 40% by mass or more and 80% by mass or less relative to the binder resin.

The inorganic particles may be subjected to a surface treatment. The inorganic particles may be used as a mixture of two or more inorganic particles subjected to different surface treatments or a mixture of two or more inorganic particles having different particle diameters.

Examples of the surface treatment agent include silane coupling agents, titanate-based coupling agents, aluminum-based coupling agents, and surfactants. In particular, silane coupling agents are preferred, and amino-group-containing silane coupling agents are more preferred.

Examples of amino-group-containing silane coupling agents include, but are not limited to, 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane.

Silane coupling agents may be used as a mixture of two or more kinds thereof. For example, an amino-group-containing silane coupling agent and another silane coupling agent may be used in combination. Examples of other silane coupling agents include, but are not limited to, vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

The surface treatment method with a surface treatment agent may be any publicly known method and may be a dry method or a wet method.

The treatment amount of the surface treatment agent is preferably, for example, 0.5% by mass or more and 10% by mass or less relative to the inorganic particles.

Here, the undercoat layer may contain an electron-accepting compound (acceptor compound) along with the inorganic particles from the viewpoint of enhancing long-term stability of electrical properties and carrier blocking properties.

Examples of the electron-accepting compound include electron-transporting substances such as quinone compounds, e.g., chloranil and bromanil; tetracyanoquinodimethane compounds; fluorenone compounds, e.g., 2,4,7-trinitrofluorenone and 2,4,5,7-tetranitro-9-fluorenone; oxadiazole compounds, e.g., 2-(4-biphenyl)-5-(4-tert-butylphenyl)-1,3,4-oxadiazole, 2,5-bis(4-naphthyl)-1,3,4-oxadiazole, and 2,5-bis(4-diethylaminophenyl)-1,3,4-oxadiazole; xanthone compounds; thiophene compounds; and diphenoquinone compounds, e.g., 3,3',5,5'-tetra-tert-butyldiphenoquinone.

In particular, the electron-accepting compound is preferably a compound having an anthraquinone structure. Examples of the compounds having an anthraquinone structure include hydroxyanthraquinone compounds, aminoanthraquinone compounds, and aminohydroxyanthraquinone compounds. Specific examples thereof include anthraquinone, alizarin, quinizarin, anthrarufin, and purpurin.

The electron-accepting compound may be contained in the undercoat layer in a state of being dispersed along with the inorganic particles or in a state of adhering to the surfaces of the inorganic particles.

Examples of the method for causing the electron-accepting compound to adhere to the surfaces of the inorganic particles include a dry method and a wet method.

An example of the dry method is a method with which, while inorganic particles are stirred with a mixer or the like that applies a large shear force, an electron-accepting compound is added dropwise or sprayed along with dry air or nitrogen gas either directly or in the form of an organic solvent solution to cause the electron-accepting compound to adhere to the surfaces of the inorganic particles. The dropwise addition or spraying of the electron-accepting compound may be conducted at a temperature equal to or lower than the boiling point of the solvent. After the dropwise addition or spraying of the electron-accepting compound, baking may be further conducted at 100° C. or higher. The temperature and time for baking are not particularly limited as long as electrophotographic properties are obtained.

An example of the wet method is a method with which, while inorganic particles are dispersed in a solvent by stirring, by applying ultrasonic waves, or by using a sand mill, an attritor, a ball mill, or the like, an electron-accepting compound is added, and stirred or dispersed, and the solvent is then removed to cause the electron-accepting compound to adhere to the surfaces of the inorganic particles. Examples of the method for removing the solvent include filtration and distillation. After the removal of the solvent, baking may be further conducted at 100° C. or higher. The temperature and time for baking are not particularly limited as long as electrophotographic properties are obtained. In the wet method, water contained in the inorganic particles may be removed before the addition of the electron-accepting compound, and for example, a method of removing the water under stirring and heating in the solvent or a method of removing the water by azeotropy with the solvent may be employed.

The adhesion of the electron-accepting compound may be conducted either before or after the inorganic particles are subjected to the surface treatment with the surface treatment agent. Alternatively, the adhesion of the electron-accepting compound and the surface treatment with the surface treatment agent may be conducted at the same time.

The content of the electron-accepting compound may be, for example, 0.01% by mass or more and 20% by mass or less and is preferably 0.01% by mass or more and 10% by mass or less relative to the inorganic particles.

Examples of the binder resin used in the undercoat layer include publicly known materials such as publicly known polymer compounds, e.g., acetal resins (for example, polyvinyl butyral), polyvinyl alcohol resins, polyvinyl acetal resins, casein resins, polyamide resins, cellulose resins, gelatin, polyurethane resins, polyester resins, unsaturated polyester resins, methacrylic resins, acrylic resins, polyvinyl chloride resins, polyvinyl acetate resins, vinyl chloride-vinyl acetate-maleic anhydride resins, silicone resins, silicone-alkyd resins, urea resins, phenolic resins, phenol-formaldehyde resins, melamine resins, urethane resins, alkyd resins, and epoxy resins; zirconium chelate compounds; titanium chelate compounds; aluminum chelate compounds; titanium alkoxide compounds; organotitanium compounds; and silane coupling agents.

Examples of the binder resin used in the undercoat layer further include charge-transporting resins having a charge-transporting group, and conductive resins (such as polyaniline).

Among these, a resin that is insoluble in the coating solvent of the overlying layer is suitable as the binder resin used in the undercoat layer. In particular, the binder resin is suitably a thermosetting resin such as a urea resin, a phenolic resin, a phenol-formaldehyde resin, a melamine resin, a urethane resin, an unsaturated polyester resin, an alkyd resin, or an epoxy resin; or a resin obtained by a reaction between a curing agent and at least one resin selected from the group consisting of polyamide resins, polyester resins, polyether resins, methacrylic resins, acrylic resins, polyvinyl alcohol resins, and polyvinyl acetal resins.

When two or more of these binder resins are used in combination, the mixing ratio is determined as necessary.

The undercoat layer may contain various additives to improve electrical properties, environmental stability, and image quality.

Examples of the additives include publicly known materials such as electron-transporting pigments such as polycyclic condensed pigments and azo pigments, zirconium chelate compounds, titanium chelate compounds, aluminum chelate compounds, titanium alkoxide compounds, organotitanium compounds, and silane coupling agents. The silane coupling agents are used for the surface treatment of the inorganic particles as described above, but may be further added as an additive to the undercoat layer.

Examples of the silane coupling agents used as an additive include vinyltrimethoxysilane, 3-methacryloxypropyl-tris(2-methoxyethoxy) silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compounds include zirconium butoxide, zirconium ethyl acetoacetate, zirconium triethanolamine, acetylacetonate zirconium butoxide, ethyl acetoacetate zirconium butoxide, zirconium acetate, zirconium oxalate, zirconium lactate, zirconium phosphonate, zirconium octanoate, zirconium naphthenate, zirconium laurate, zirconium stearate, zirconium isostearate, methacrylate zirconium butoxide, stearate zirconium butoxide, and isostearate zirconium butoxide.

Examples of the titanium chelate compounds include tetraisopropyl titanate, tetra-n-butyl titanate, butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanolaminate, and polyhydroxytitanium stearate.

Examples of the aluminum chelate compounds include aluminum isopropylate, monobutoxyaluminum diisopropylate, aluminum butyrate, diethylacetoacetate aluminum diisopropylate, and aluminum tris(ethylacetoacetate).

These additives may be used alone or as a mixture or polycondensate of plural compounds.

The undercoat layer may have a Vickers hardness of 35 or more.

In order to suppress moire fringes, the surface roughness (ten-point average roughness) of the undercoat layer may be adjusted to be in the range of 1/(4n) (where n represents the refractive index of the overlying layer) to ½ of the laser wavelength λ used for exposure.

In order to adjust the surface roughness, for example, resin particles may be added to the undercoat layer. Examples of the resin particles include silicone resin particles, and crosslinked polymethyl methacrylate resin particles. The surface of the undercoat layer may be polished to adjust the surface roughness. Examples of the polishing method include buff polishing, sand blasting, wet honing, and grinding.

The method for forming the undercoat layer is not particularly limited, and any well-known formation method may be employed. For example, a coating liquid for forming the undercoat layer is prepared by adding the above components to a solvent, and a coating film of the coating liquid is formed, dried, and optionally heated.

Examples of the solvent used for preparing the coating liquid for forming the undercoat layer include publicly known organic solvents such as alcohol solvents, aromatic hydrocarbon solvents, halogenated hydrocarbon solvents, ketone solvents, ketone alcohol solvents, ether solvents, and ester solvents.

Specific examples of the solvent include common organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method for dispersing inorganic particles in preparing the coating liquid for forming the undercoat layer include publicly known methods that use a roll mill, a ball mill, a vibrating ball mill, an attritor, a sand mill, a colloid mill, a paint shaker, or the like.

Examples of the method for applying the coating liquid for forming the undercoat layer to the conductive substrate include common methods such as a blade coating method, a wire bar coating method, a spray coating method, a dip coating method, a bead coating method, an air knife coating method, and a curtain coating method.

The thickness of the undercoat layer is, for example, preferably set within the range of 15 μm or more, and more preferably 20 μm or more and 50 μm or less.

Intermediate Layer

An intermediate layer may be further provided between the undercoat layer and the photosensitive layer, although not illustrated in the drawing.

The intermediate layer is, for example, a layer that contains a resin. Examples of the resin used in the intermediate layer include polymer compounds such as acetal resins (e.g., polyvinyl butyral), polyvinyl alcohol resins, polyvinyl acetal resins, casein resins, polyamide resins, cellulose resins, gelatin, polyurethane resins, polyester resins, methacrylic resins, acrylic resins, polyvinyl chloride resins, polyvinyl acetate resins, vinyl chloride-vinyl acetate-maleic anhydride resins, silicone resins, silicone-alkyd resins, phenol-formaldehyde resins, and melamine resins.

The intermediate layer may be a layer that contains an organometallic compound. Examples of the organometallic compound used in the intermediate layer include organometallic compounds containing a metal atom such as zirconium, titanium, aluminum, manganese, or silicon.

These compounds used in the intermediate layer may be used alone or as a mixture or polycondensate of plural compounds.

In particular, the intermediate layer may be a layer that contains an organometallic compound containing a zirconium atom or a silicon atom.

The method for forming the intermediate layer is not particularly limited, and any well-known formation method may be employed. For example, a coating liquid for forming the intermediate layer is prepared by adding the above components to a solvent, and a coating film of the coating liquid is formed, dried, and optionally heated.

Examples of the coating method for forming the intermediate layer include common methods such as a dip coating method, a lift coating method, a wire bar coating method, a spray coating method, a blade coating method, a knife coating method, and a curtain coating method.

The thickness of the intermediate layer is, for example, preferably set within the range of 0.1 μm or more and 3 μm or less. The intermediate layer may be used as the undercoat layer.

Charge Generation Layer

The charge generation layer is, for example, a layer that contains a charge-generating material and a binder resin. The charge generation layer may be a layer formed by vapor deposition of a charge-generating material. Such a layer formed by vapor deposition of a charge-generating material may be used when an incoherent light source, such as a light emitting diode (LED) or an organic electro-luminescence (EL) image array, is used.

Examples of the charge-generating material include azo pigments such as bisazo and trisazo pigments; fused-ring aromatic pigments such as dibromoanthanthrone; perylene pigments; pyrrolopyrrole pigments; phthalocyanine pigments; zinc oxide; and trigonal selenium.

For laser exposure in the near-infrared region, among these, a metal phthalocyanine pigment or a metal-free phthalocyanine pigment may is preferably used as the charge-generating material. Specifically, for example, hydroxygallium phthalocyanine, chlorogallium phthalocyanine, dichlorotin phthalocyanine, and titanyl phthalocyanine are more preferred.

On the other hand, for laser exposure in the near-ultraviolet region, the charge-generating material is preferably, for example, a fused-ring aromatic pigment such as dibromoanthanthrone, a thioindigo pigment, a porphyrazine compound, zinc oxide, trigonal selenium, or a bisazo pigment.

When an incoherent light source, such as an LED or organic EL image array having an emission center wavelength in the range of 450 nm or more and 780 nm or less, is used, the charge-generating material described above may be used; however, from the viewpoint of the resolution, when the photosensitive layer is used in the form of a thin film having a thickness of 20 μm or less, the electric field strength in the photosensitive layer is increased, and a decrease in the degree of charging due to charges injected from the substrate, that is, an image defect called a black spot tends to occur. This is more likely to occur when a p-type semiconductor, which easily generates a dark current, such as trigonal selenium or a phthalocyanine pigment, is used as the charge-generating material.

In contrast, when an n-type semiconductor, such as a fused-ring aromatic pigment, a perylene pigment, or an azo pigment, is used as the charge-generating material, a dark current is unlikely to generate, and an image defect called a black spot may be suppressed even in the form of a thin film.

Whether the n-type or not is determined on the basis of the polarity of a flowing photocurrent by a time-of-flight method that is commonly used, and a material in which electrons are more likely to flow as carriers than holes is determined to be n-type.

The binder resin used in the charge generation layer is selected from a wide range of insulating resins and may be selected from organic photoconductive polymers, such as poly-N-vinylcarbazole, polyvinyl anthracene, polyvinyl pyrene, and polysilane.

Examples of the binder resin include polyvinyl butyral resins, polyarylate resins (e.g., polycondensates of bisphenols and divalent aromatic carboxylic acids), polycarbonate resins, polyester resins, phenoxy resins, vinyl chloride-vinyl acetate copolymers, polyamide resins, acrylic resins, polyacrylamide resins, polyvinyl pyridine resins, cellulose resins, urethane resins, epoxy resins, casein, polyvinyl alcohol resins, and polyvinylpyrrolidone resins. Herein, the term "insulating" means having a volume resistivity of $10^{13}$ Ω cm or more.

These binder resins are used alone or as a mixture of two or more kinds thereof.

The blend ratio of the charge-generating material to the binder resin is preferably in the range of 10:1 to 1:10 in terms of mass ratio.

The charge generation layer may contain other well-known additives.

The method for forming the charge generation layer is not particularly limited, and any well-known formation method may be employed. For example, a coating liquid for forming the charge generation layer is prepared by adding the above components to a solvent, and a coating film of the coating liquid is formed, dried, and optionally heated. The charge generation layer may be formed by vapor deposition of a charge-generating material. The formation of the charge generation layer by vapor deposition is particularly suitable for the case where a fused-ring aromatic pigment or a perylene pigment is used as the charge-generating material.

Examples of the solvent used for preparing the coating liquid for forming the charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or as a mixture of two or more kinds thereof.

Examples of the method for dispersing particles (for example, the charge-generating material) in the coating liquid for forming the charge generation layer include methods using a media disperser such as a ball mill, a vibrating ball mill, an attritor, a sand mill, or a horizontal sand mill, or a media-less disperser such as a stirrer, an ultrasonic disperser, a roll mill, or a high-pressure homogenizer. Examples of the high-pressure homogenizer include a collision-type homogenizer in which a dispersion is dispersed through liquid-liquid collision or liquid-wall collision in a high-pressure state, and a penetration-type homogenizer in which a dispersion is dispersed by causing the dispersion to penetrate through a fine flow path in a high-pressure state.

In the case of this dispersion, it is effective to adjust the average particle diameter of the charge-generating material in the coating liquid for forming the charge generation layer to 0.5 μm or less, preferably 0.3 μm or less, and more preferably or 0.15 μm or less.

Examples of the method for applying the coating liquid for forming the charge generation layer to the undercoat layer (or the intermediate layer) include common methods such as a blade coating method, a wire bar coating method, a spray coating method, a dip coating method, a bead coating method, an air knife coating method, and a curtain coating method.

The thickness of the charge generation layer is, for example, preferably set within the range of 0.1 μm or more and 5.0 μm or less, and more preferably 0.2 μm or more and 2.0 μm or less.

Charge Transport Layer

The charge transport layer is, for example, a layer that contains a charge-transporting material and a binder resin. The charge transport layer may be a layer that contains a polymer charge-transporting material as the charge-transporting material.

When the charge transport layer is the outermost surface layer, the charge transport layer contains fluorine-containing resin particles in addition to the binder resin and the charge-transporting material.

When another layer (for example, a protective layer or the like) is disposed on the charge transport layer and the charge transport layer is not the outermost surface layer, the charge transport layer contains at least the binder resin and the charge-transporting material and may optionally contain other additives. The binder resin, the charge-transporting material, and the other additives are the same as those in the case where the charge transport layer is the outermost surface layer.

The components contained in the charge transport layer which is the outermost surface layer will be described below.

Binder Resin

Examples of the binder resin used in the charge transport layer include polycarbonate resins, polyester resins, polyarylate resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone alkyd resins, phenol-formaldehyde resins, styrene-alkyd resins, poly-N-vinylcarbazole, and polysilane. Among these, a polycarbonate resin or a polyarylate resin is suitable as the binder resin. These binder resins are used alone or in combination of two or more kinds thereof.

The blend ratio of the charge-transporting material to the binder resin is preferably in the range of 10:1 to 1:5 in terms of mass ratio.

Herein, the content of the binder resin is, for example, preferably 10% by mass or more and 90% by mass or less, more preferably 30% by mass or more and 90% by mass or less, and still more preferably 50% by mass or more and 90% by mass or less relative to the total solid content of the photosensitive layer (charge transport layer).

Charge-Transporting Material

Examples of the charge-transporting material include electron-transporting compounds such as quinone compounds, e.g., p-benzoquinone, chloranil, bromanil, and anthraquinone; tetracyanoquinodimethane compounds; fluorenone compounds, e.g., 2,4,7-trinitrofluorenone; xanthone compounds; benzophenone compounds; cyanovinyl compounds; and ethylene compounds. Examples of the charge-transporting material further include hole-transporting compounds such as triarylamine compounds, benzidine compounds, aryl alkane compounds, aryl-substituted ethylene compounds, stilbene compounds, anthracene compounds, and hydrazone compounds. These charge-transporting materials are used alone or in combination of two or more kinds thereof but are not limited to these materials.

From the viewpoint of charge mobility, the charge-transporting material is preferably a triarylamine derivative represented by structural formula (a-1) below or a benzidine derivative represented by structural formula (a-2) below.

(a-1)

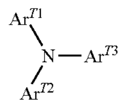

In structural formula (a-1), $Ar^{T1}$, $Ar^{T2}$ and $Ar^{T3}$ each independently represent a substituted or unsubstituted aryl group, $-C_6H_4-C(R^{T4})=C(R^{T5})(R^{T6},)$ or $-C_6H_4-CH=CH-CH=C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent for each of the groups described above include halogen atoms, alkyl groups having 1 to 5 carbon atoms, and alkoxy groups having 1 to 5 carbon atoms. Examples of the substituent for each of the groups described above further include substituted amino groups substituted with an alkyl group having 1 to 3 carbon atoms.

(a-2)

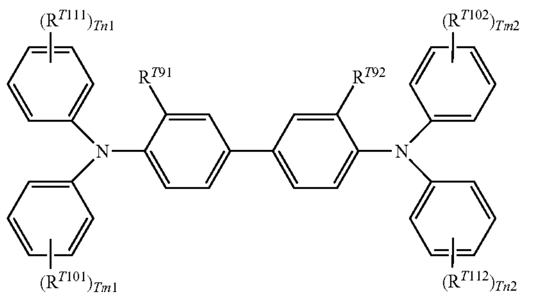

In structural formula (a-2), $R^{T91}$ and $R^{T92}$ each independently represent a hydrogen atom, a halogen atom, an alkyl group having 1 to 5 carbon atoms, or an alkoxy group having 1 to 5 carbon atoms. $R^{T101}$, $R^{T102}$, $R^{T111}$, and $R^{T112}$ each independently represent a halogen atom, an alkyl group having 1 to 5 carbon atoms, an alkoxy group having 1 to 5 carbon atoms, an amino group substituted with an alkyl group having 1 or 2 carbon atoms, a substituted or unsubstituted aryl group, $-C(R^{T12})=C(R^{T13})(R^{T14})$, or $-CH=CH-CH=C(R^{T15})(R^{T16})$ where $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or more and 2 or less.

Examples of the substituent for each of the groups described above include halogen atoms, alkyl groups having 1 to 5 carbon atoms, and alkoxy groups having 1 to 5 carbon atoms. Examples of the substituent for each of the groups described above further include substituted amino groups substituted with an alkyl group having 1 to 3 carbon atoms.

Here, among the triarylamine derivatives represented by structural formula (a-1) and the benzidine derivatives represented by structural formula (a-2), in particular, a triarylamine derivative having the $-C_6H_4-CH=CH-CH=C(R^{T7})(R^{T8})$ group and a benzidine derivative having the $-CH=CH-CH=C(R^{T15})(R^{T16})$ group are preferred from the viewpoint of charge mobility.

A publicly known polymer material having a charge-transporting property, such as poly-N-vinylcarbazole or polysilane is used as the polymer charge-transporting material. In particular, polyester polymer charge-transporting materials are preferred. The polymer charge-transporting material may be used alone or in combination with a binder resin.

Herein, a mass ratio of the charge-transporting material to the binder resin (charge-transporting material/binder resin) is preferably 40/60 or more and 42/58 or less.

When the mass ratio of the charge-transporting material to the binder resin is within this range, the accumulation of charges is unlikely to occur, and an increase in the residual potential is suppressed. As a result, the potential retainability of the photoreceptor is enhanced. The reason for this is supposed as follows. When the mass proportion of the charge-transporting material is increased, the electrical conductivity of the photosensitive film is improved. Accordingly, since charges moving in the film are transported before they accumulate, the accumulation of the charges is unlikely to occur. On the other hand, when the mass proportion of the charge-transporting material is excessively increased, the proportion of the binder resin may be relatively low. As a result, a decrease in mechanical strength, and furthermore, wear resistance of the film may be caused. For this reason, the mass ratio of the charge-transporting material to the binder resin is preferably within the range described above.

Fluorine-Containing Resin Particles

The fluorine-containing resin particles contain no carboxy group or contain carboxy group in a very small amount, if any. Specifically, the number of carboxy groups contained in the fluorine-containing resin particles is 0 or more and 30 or less, and preferably 0 or more and 20 or less per $10^6$ carbon atoms.

A reduction in the number of carboxy groups contained in the fluorine-containing resin particles improves chargeability.

Here, the carboxy groups in the fluorine-containing resin particles are, for example, carboxy groups derived from terminal carboxylic acids contained in the fluorine-containing resin particles.

Examples of the method for reducing the amount of carboxy groups contained in the fluorine-containing resin particle include (1) a method that does not include applying radiation during the process of producing particles and (2) a method in which during irradiation with radiation, the irradiation is performed under a condition in which oxygen is not present or the oxygen concentration is reduced.

The amount of carboxy groups contained in the fluorine-containing resin particles is measured as follows as described in, for example, Japanese Unexamined Patent Application Publication No. 4-20507.

Fluorine-containing resin particles are pre-formed by a press machine to prepare a film having a thickness of about 0.1 mm. An infrared absorption spectrum of the prepared film is measured. An infrared absorption spectrum of fluorine-containing resin particles in which carboxylic acid terminals are completely fluorinated and which are prepared by bringing the fluorine-containing resin particles into contact with fluorine gas is also measured, and the number of terminal carboxy groups (per $10^6$ carbon atoms) is calculated by the following formula from the difference between the two spectra.

The number of terminal carboxy groups (per $10^6$ carbon atoms)$=(l\times K)/t$ Formula:

l: absorbance
K: correction factor
t: thickness (mm) of film

The absorption wavenumber of the carboxy group is assumed to be 3,560 $cm^{-1}$, and the correction factor is assumed to be 440.

The content of perfluorooctanoic acid (hereinafter also referred to as "PFOA") contained in the fluorine-containing resin particles is preferably 0 ppb or more and 25 ppb or less, preferably 0 ppb or more and 20 ppb or less, and more preferably 0 ppb or more and 15 ppb or less relative to the fluorine-containing resin particles. Note that "ppb" is on a mass basis.

A reduction in the PFOA content in the fluorine-containing resin particles improves chargeability.

During the process of producing fluorine-containing resin particles (in particular, fluorine-containing resin particles such as polytetrafluoroethylene particles, modified polytetrafluoroethylene particles, and perfluoroalkyl ether/tetrafluoroethylene copolymer particles), PFOA is used or generated as a by-product, and thus the resulting fluorine-containing resin particles often contain PFOA.

PFOA has a carboxy group, which may cause a decrease in chargeability. Therefore, the fluorine-containing resin particles may contain no PFOA or contain PFOA in a very small amount, if any.

An example of the method for reducing the amount of PFOA is a method including sufficiently washing fluorine-containing resin particles with, for example, pure water, alkaline water, an alcohol (such as methanol, ethanol, or isopropanol), a ketone (such as acetone, methyl ethyl ketone, or methyl isobutyl ketone), an ester (such as ethyl acetate), or another common organic solvent (such as toluene or tetrahydrofuran). Washing may be conducted at room temperature, but washing under heating enables the amount of PFOA to be efficiently reduced.

The amount of PFOA is a value measured by the following method.

Pretreatment of Sample

The charge transport layer (that is, the outermost surface layer) containing fluorine-containing resin particles is immersed in a solvent (for example, tetrahydrofuran) to dissolve substances other than those insoluble in the solvent (for example, tetrahydrofuran) and fluorine-containing resin particles, the resulting solution is then added to pure water dropwise, and precipitates are separated by filtration. The resulting solution containing PFOA is collected. Furthermore, the insoluble matter obtained by filtration is dissolved in a solvent, the resulting solution is then added to pure water dropwise, and precipitates are separated by filtration. The resulting solution containing PFOA is collected. This operation is repeated five times, and the aqueous solution collected in all the operations is used as a pretreated aqueous solution.

Measurement

A sample solution is prepared using the pretreated aqueous solution obtained by the operation described above and is measured in accordance with the method described in "Analysis of Perfluorooctanesulfonic Acid (PFOS) and Perfluorooctanoic Acid (PFOA) in Environmental Water, Sediment, and Living Organisms, by Research Institute for Environmental Sciences and Public Health of Iwate Prefecture".

Examples of the fluorine-containing resin particles include particles of a fluoroolefin homopolymer, and particles of a copolymer of two or more monomers, the copolymer being a copolymer of at least one fluoroolefin and a fluorine-free monomer (that is, a monomer that does not contain a fluorine atom).

Examples of the fluoroolefin include perhaloolefins such as tetrafluoroethylene (TFE), perfluorovinyl ether, hexafluoropropylene (HFP), and chlorotrifluoroethylene (CTFE); and non-perfluoroolefins such as vinylidene fluoride (VdF), trifluoroethylene, and vinyl fluoride. Among these, for example, VdF, TFE, CTFE, and HFP are preferred.

On the other hand, examples of the fluorine-free monomer include hydrocarbon olefins such as ethylene, propylene, and butene; alkyl vinyl ethers such as cyclohexyl vinyl ether (CHVE), ethyl vinyl ether (EVE), butyl vinyl ether, and methyl vinyl ether; alkenyl vinyl ethers such as polyoxyethylene allyl ether (POEAE) and ethyl allyl ether; organosilicon compounds having an active α,β-unsaturated group such as vinyltrimethoxysilane (VSi), vinyltriethoxysilane, and vinyltris(methoxyethoxy)silane; acrylic acid esters such as methyl acrylate and ethyl acrylate; methacrylic acid esters such as methyl methacrylate and ethyl methacrylate; and vinyl esters such as vinyl acetate, vinyl benzoate, and "VeoVa" (trade name, vinyl ester manufactured by Shell). Among these, alkyl vinyl ethers, allyl vinyl ether, vinyl esters, and organosilicon compounds having an active α,β-unsaturated group are preferred.

Among these, particles having a high fluorination rate are preferred as the fluorine-containing resin particles. Particles of polytetrafluoroethylene (PTFE), tetrafluoroethylene-hexafluoropropylene copolymers (FEP), tetrafluoroethylene-perfluoro(alkyl vinyl ether) copolymers (PFA), ethylene-tetrafluoroethylene copolymers (ETFE), and ethylene-chlorotrifluoroethylene copolymers (ECTFE) are more preferred, and particles of PTFE, FEP, and PFA are particularly preferred.

The fluorine-containing resin particles may be polymerization-type fluorine-containing resin particles. The polymerization-type fluorine-containing resin particles refer to fluorine-containing resin particles that are granulated along with polymerization by, for example, a suspension polymerization method or an emulsion polymerization method and that are not irradiated with radiation, as described above.

The method for producing fluorine-containing resin particles by the suspension polymerization method is a method in which, for example, additives such as a polymerization initiator and a catalyst are suspended in a dispersion medium together with a monomer for forming a fluorine-containing resin, and a polymerized product is subsequently granulated while the monomer is polymerized.

The method for producing fluorine-containing resin particles by the emulsion polymerization method is a method in which, for example, additives such as a polymerization initiator and a catalyst are emulsified with a surfactant (that is, an emulsifier) in a dispersion medium together with a monomer for forming a fluorine-containing resin, and a polymerized product is subsequently granulated while the monomer is polymerized.

In particular, the fluorine-containing resin particles may be particles obtained without radiation irradiation in the production process.

However, the fluorine-containing resin particles may be radiation irradiation-type fluorine-containing resin particles irradiated with radiation under a condition in which oxygen is not present or the oxygen concentration is reduced.

The average particle diameter of the fluorine-containing resin particles is not particularly limited but is preferably 0.2 μm or more and 4.5 μm or less, and more preferably 0.2 μm or more and 4 μm or less. Fluorine-containing resin particles (in particular, fluorine-containing resin particles such as PTFE particles) having an average particle diameter of 0.2 μm or more and 4.5 μmor less tend to contain PFOA in a large amount. Accordingly, in particular, fluorine-containing resin particles having an average particle diameter of 0.2 μmor more and 4.5 μm or less tend to have low chargeability. However, when the amount of PFOA is reduced to the range described above, even such fluorine-containing resin particles having an average particle diameter of 0.2 μm or more and 4.5 μm or less have enhanced chargeability.

The average particle diameter of the fluorine-containing resin particles is a value measured by the following method.

Fluorine-containing resin particles are observed with a scanning electron microscope (SEM) at a magnification of, for example, 5,000 or more to measure the maximum diameters of the fluorine-containing resin particles (secondary particles formed by agglomeration of primary particles), and the average determined from the maximum diameters of fifty particles measured as described above is defined as the average particle diameter of the fluorine-containing resin particles. A JSM-6700F manufactured by JEOL LTD. is used as the SEM, and a secondary electron image at an accelerating voltage of 5 kV is observed.

The specific surface area (BET specific surface area) of the fluorine-containing resin particles is preferably 5 $m^2/g$ or more and 15 $m^2/g$ or less and more preferably 7 $m^2/g$ or more and 13 $m^2/g$ or less from the viewpoint of dispersion stability.

The specific surface area is a value measured by a nitrogen substitution method using a BET specific surface area analyzer (FlowSorb II 2300, manufactured by Shimadzu Corporation).

The apparent density of the fluorine-containing resin particles is preferably 0.2 g/mL or more and 0.5 g/mL or less, and more preferably 0.3 g/mL or more and 0.45 g/mL or less from the viewpoint of dispersion stability.

The apparent density is a value measured in accordance with JIS K6891 (1995).

The melting temperature of the fluorine-containing resin particles is preferably 300° C. or higher and 340° C. or lower and more preferably 325° C. or higher and 335° C. or lower.

The melting temperature is the melting point measured in accordance with JIS K6891 (1995).

A dispersant having a fluorine atom (hereinafter also referred to as a “fluorine-containing dispersant) may adhere to the surfaces of the fluorine-containing resin particles.

Examples of the fluorine-containing dispersant include polymers obtained by homopolymerization or copolymerization of a polymerizable compound having a fluorinated alkyl group (hereinafter also referred to as “fluorinated alkyl group-containing polymers”).

Specific examples of the fluorine-containing dispersant include homopolymers of (meth)acrylates having a fluorinated alkyl group, and random or block copolymers of (meth)acrylates having a fluorinated alkyl group and monomers having no fluorine atom. Note that the term “(meth) acrylate” refers to both an acrylate and a methacrylate.

Examples of (meth)acrylates having a fluorinated alkyl group include 2,2,2-trifluoroethyl (meth)acrylate and 2,2,3,3-pentafluoropropyl (meth)acrylate.

Examples of monomers having no fluorine atom include (meth)acrylate, isobutyl (meth)acrylate, tert-butyl (meth) acrylate, isooctyl (meth)acrylate, lauryl (meth)acrylate, stearyl (meth)acrylate, isobornyl (meth)acrylate, cyclohexyl (meth)acrylate, 2-methoxyethyl (meth)acrylate, methoxytriethylene glycol (meth)acrylate, 2-ethoxyethyl (meth)acrylate, tetrahydrofurfuryl (meth)acrylate, benzyl (meth)acrylate, ethyl carbitol (meth)acrylate, phenoxyethyl (meth) acrylate, 2-hydroxy (meth)acrylate, 2-hydroxypropyl (meth) acrylate, 4-hydroxybutyl (meth)acrylate, methoxypolyethylene glycol (meth)acrylate, phenoxypolyethylene glycol (meth)acrylate, hydroxyethyl-o-phenylphenol (meth)acrylate, and o-phenylphenol glycidyl ether (meth)acrylate.

Other specific examples of fluorine-containing dispersants include block or branched polymers. Other specific examples of fluorine-containing dispersants further include fluorine surfactants.

Among these, the fluorine-containing dispersant is preferably a fluorinated alkyl group-containing polymer having a structural unit represented by general formula (FA) below and is more preferably a fluorinated alkyl group-containing polymer having a structural unit represented by general formula (FA) below and a structural unit represented by general formula (FB) below.

The fluorinated alkyl group-containing polymer having a structural unit represented by general formula (FA) below and a structural unit represented by general formula (FB) below will be described below.

(FA)

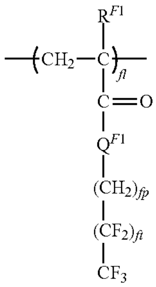

(FB)

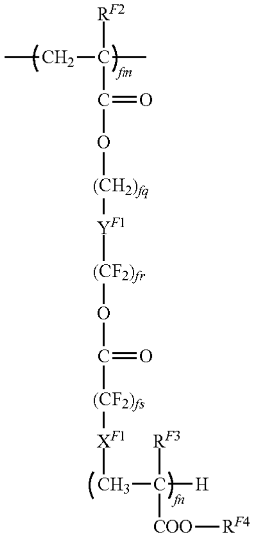

In general formulae (FA) and (FB), $R^{F1}$, $R^{F2}$, $R^{F3}$, and $R^{F4}$ each independently represent a hydrogen atom or an alkyl group.

$X^{F1}$ represents an alkylene chain, a halogen-substituted alkylene chain, —S—, —O—, —NH—, or a single bond.

$Y^{F1}$ represents an alkylene chain, a halogen-substituted alkylene chain, $—(C_{fx}H_{2fx-1}(OH))—$, or a single bond.

$Q^{F1}$ represents —O— or —NH—.

fl, fm, and fn each independently represent an integer of 1 or more.

fp, fq, fr, and fs each independently represent an integer of 0 or 1 or more.

ft represents an integer of 1 or more and 7 or less.

fx represents an integer of 1 or more.

In general formulae (FA) and (FB), the groups represented by $R^{F1}$, $R^{F2}$, $R^{F3}$, and $R^{F4}$ are each independently preferably a hydrogen atom, a methyl group, an ethyl group, a propyl group, or the like, more preferably a hydrogen atom or a methyl group, and still more preferably a methyl group.

In general formulae (FA) and (FB), the alkylene chains (unsubstituted alkylene chains and halogen-substituted alkylene chains) represented by $X^{F1}$ and $Y^{F1}$ are preferably linear or branched alkylene chains having 1 to 10 carbon atoms.

In $-(C_{fx}H_{2fx-1}(OH))-$ represented by $Y^{F1}$, fx preferably represents an integer of 1 or more and 10 or less.

fp, fq, fr, and fs preferably each independently represent an integer of 0 or 1 or more and 10 or less.

fn is preferably, for example, 1 or more and 60 or less.

In the fluorine-containing dispersant, a ratio of the structural unit represented by general formula (FA) to the structural unit represented by general formula (FB), that is, fl:fm, is preferably in the range of 1:9 to 9:1 and more preferably in the range of 3:7 to 7:3.

The fluorine-containing dispersant may further have a structural unit represented by general formula (FC) in addition to the structural unit represented by general formula (FA) and the structural unit represented by general formula (FB). A content ratio (fl+fm:fz) of the total (fl+fm) of the structural units represented by general formulae (FA) and (FB) to the structural unit represented by general formula (FC) is preferably in the range of 10:0 to 7:3 and more preferably in the range of 9:1 to 7:3.

(FC)

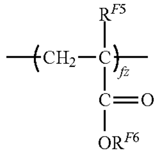

In general formula (FC), $R^{F5}$ and $R^{F6}$ each independently represent a hydrogen atom or an alkyl group. fz represents an integer of 1 or more.

In general formula (FC), the groups represented by $R^{F5}$ and $R^{F6}$ are each independently preferably a hydrogen atom, a methyl group, an ethyl group, a propyl group, or the like, more preferably a hydrogen atom or a methyl group, and still more preferably a methyl group.

Examples of commercially available products of the fluorine-containing dispersant include GF300 and GF400 (manufactured by Toagosei Co, Ltd.), Surflon series (manufactured by AGC Seimi Chemical Co., Ltd.), Ftergent series (manufactured by NEOS Company Limited), PF series (manufactured by Kitamura Chemicals Co., Ltd.), Megaface series (manufactured by DIC Corporation), and FC series (manufactured by 3M).

The weight-average molecular weight Mw of the fluorine-containing dispersant is preferably 20,000 or more and 200,000 or less, and more preferably 50,000 or more and 200,000 or less from the viewpoint of improving dispersibility of the fluorine-containing resin particles.

The weight-average molecular weight of the fluorine-containing dispersant is a value measured by gel permeation chromatography (GPC). The molecular weight measurement by GPC is conducted by, for example, using GPC•HLC-8120 manufactured by TOSOH CORPORATION as a measurement apparatus with TSKgel GMHHR-M+TSKgel GMHHR-M columns (7.8 mm I.D., 30 cm) manufactured by TOSOH CORPORATION and a chloroform solvent, and the molecular weight is calculated from the measurement results by using a molecular weight calibration curve prepared from monodisperse polystyrene standard samples.

The content of the fluorine-containing dispersant is, for example, preferably 0.5% by mass or more and 10% by mass or less, and more preferably 1% by mass or more and 7% by mass or less relative to the fluorine-containing resin particles.

The fluorine-containing dispersants may be used alone or in combination of two or more kinds thereof.

Here, examples of the method for causing a fluorine-containing dispersant to adhere to fluorine-containing resin particles include the following methods:

(1) a method including blending fluorine-containing resin particles and a fluorine-containing dispersant with a dispersion medium to prepare a dispersion of the fluorine-containing resin particles and then removing the dispersion medium from the dispersion, (2) a method including mixing fluorine-containing resin particles and a fluorine-containing dispersant in a dry powder mixer to cause the fluorine-containing dispersant to adhere to the fluorine-containing resin particles, and (3) a method including adding a fluorine-containing dispersant dissolved in a solvent to fluorine-containing resin particles dropwise while stirring and then removing the solvent.

Additives, Formation Method, and Thickness

The charge transport layer may contain other well-known additives.

The method for forming the charge transport layer is not particularly limited, and any well-known method may be employed. For example, a coating liquid for forming the charge transport layer is prepared by adding the above components to a solvent, and a coating film of the coating liquid is formed, dried, and optionally heated.

Examples of the solvent used for preparing the coating liquid for forming the charge transport layer include common organic solvents such as aromatic hydrocarbons, e.g., benzene, toluene, xylene, and chlorobenzene; ketones, e.g., acetone and 2-butanone; halogenated aliphatic hydrocarbons, e.g., methylene chloride, chloroform, and ethylene chloride; and cyclic or linear ethers, e.g., tetrahydrofuran and ethyl ether. These solvents are used alone or as a mixture of two or more kinds thereof.

Examples of the coating method for applying the coating liquid for forming the charge transport layer to the charge generation layer include common methods such as a blade coating method, a wire bar coating method, a spray coating method, a dip coating method, a bead coating method, an air knife coating method, and a curtain coating method.

The thickness of the charge transport layer is, for example, preferably set within the range of 5 μm or more and 50 μm or less, and more preferably 10 μm or more and 30 μm or less.

Single-Layer-Type Photosensitive Layer

The single-layer-type photosensitive layer (charge generation/charge transport layer) is, for example, a layer that contains a charge-generating material, a charge-transporting material, and as necessary, a binder resin and other well-known additives. These materials are the same as the materials described in the charge generation layer and the charge transport layer.

The amount of the charge-generating material contained in the single-layer-type photosensitive layer may be 0.1% by mass or more and 10% by mass or less and is preferably 0.8% by mass or more and 5% by mass or less relative to the total solid content. The amount of the charge-transporting material contained in the single-layer-type photosensitive layer may be 5% by mass or more and 50% by mass or less relative to the total solid content.

The method for forming the single-layer-type photosensitive layer is the same as the method for forming the charge generation layer and the charge transport layer.

The thickness of the single-layer-type photosensitive layer may be, for example, 5 μm or more and 50 μm or less and is preferably 10 μm or more and 40 μm or less.

Charging Device

Examples of the charging device 20 include contact-type chargers that use, for example, conductive charging rollers, charging brushes, charging films, charging rubber blades, or charging tubes. Examples of the charging device 20 further include publicly known chargers such as non-contact-type roller chargers, and scorotron chargers and corotron chargers that utilize corona discharge. The charging device 20 may be a contact-type charger.

Exposure Device

An example of the exposure device 30 is an optical device that exposes the surface of the electrophotographic photoreceptor 10 to light such as semiconductor laser light, LED light, or liquid crystal shutter light to form an image pattern on the surface. The wavelength of the light source may be within the range of the spectral sensitivity of the electrophotographic photoreceptor 10. Semiconductor lasers used may be, for example, near-infrared lasers having an oscillation wavelength of about 780 nm. However, the wavelength is not limited to this, and a laser having an oscillation wavelength on the order of 600 nm or a blue laser having an oscillation wavelength of 400 nm or more and 450 nm or less may also be used. A surface-emitting laser light source that outputs multiple beams is also effectively used as the exposure device 30 in order to form color images, for example.

Developing Device

The developing device 40 may be, for example, a typical developing device that performs development with a developer in a contact or non-contact manner. The developing device 40 is not limited as long as the device has the above function, and is selected according to the purpose. An example thereof is a publicly known developing unit having a function of causing a developer to adhere to the electrophotographic photoreceptor 10 with a brush, a roller, or the like. In particular, a developing device including a developing roller that holds the developer on the surface thereof may be used.

The developer used in the developing device 40 may be a one-component developer composed of a toner or a two-component developer containing a toner and a carrier.

Transfer Device

Examples of the transfer device 50 include contact-type transfer chargers that use, for example, belts, rollers, films, or rubber blades, and publicly known transfer chargers such as scorotron transfer chargers and corotron transfer chargers that utilize corona discharge.

Cleaning Device

The cleaning device 70 is configured to include, for example, a housing 71, a cleaning blade 72, and a cleaning brush 73 disposed downstream of the cleaning blade 72 in the rotation direction of the electrophotographic photoreceptor 10. In addition, for example, a solid lubricant 74 is disposed in contact with the cleaning brush 73.

Optical Discharging Device

An example of the optical discharging device 80 is a publicly known optical discharging device that includes a light source such as a tungsten lamp or a light emitting diode (LED).

The light quantity of discharging light emitted from the optical discharging device 80 is 1.0 μW or more and 50.0 μW or less.

When the light quantity of discharging light is 1.0 μW or more, sufficient discharging is performed, and image density retainability is ensured.

On the other hand, by suppressing the light quantity of discharging light to 50.0 μW or less, the energization charge amount is reduced to suppress an increase in the residual potential. As a result, the photoreceptor exhibits good potential retainability together with good image density retainability.

The light quantity of discharging light is preferably 5.0 μW or more and 30.0 μW or less.

The operation of the image forming apparatus 101 according to the exemplary embodiment will now be described. First, the electrophotographic photoreceptor 10 rotates in the direction indicated by the arrow A and is negatively charged by the charging device 20 at the same time.

The electrophotographic photoreceptor 10 having a surface negatively charged by the charging device 20 is exposed to light by the exposure device 30, and a latent image is formed on the surface.

When a part of the electrophotographic photoreceptor 10 having the latent image thereon comes close to the developing device 40, a toner is caused to adhere to the latent image by the developing device 40 (developing roller 41), and a toner image is formed. When the electrophotographic photoreceptor 10 having the toner image thereon further rotates in the direction indicated by the arrow A, the toner image is transferred onto the recording sheet P by the transfer device 50. As a result, the toner image is formed on the recording sheet P.

Subsequently, the surface of the electrophotographic photoreceptor 10 is cleaned by the cleaning device 70, discharging is then performed in which the entire surface of the electrophotographic photoreceptor 10 is irradiated with discharging light by the optical discharging device 80. Subsequently, charging is performed again by the charging device 20, and the next cycle (imaging process) is performed.

The toner image formed on the recording sheet P is fixed by the fixing device 60.

Figure 3:
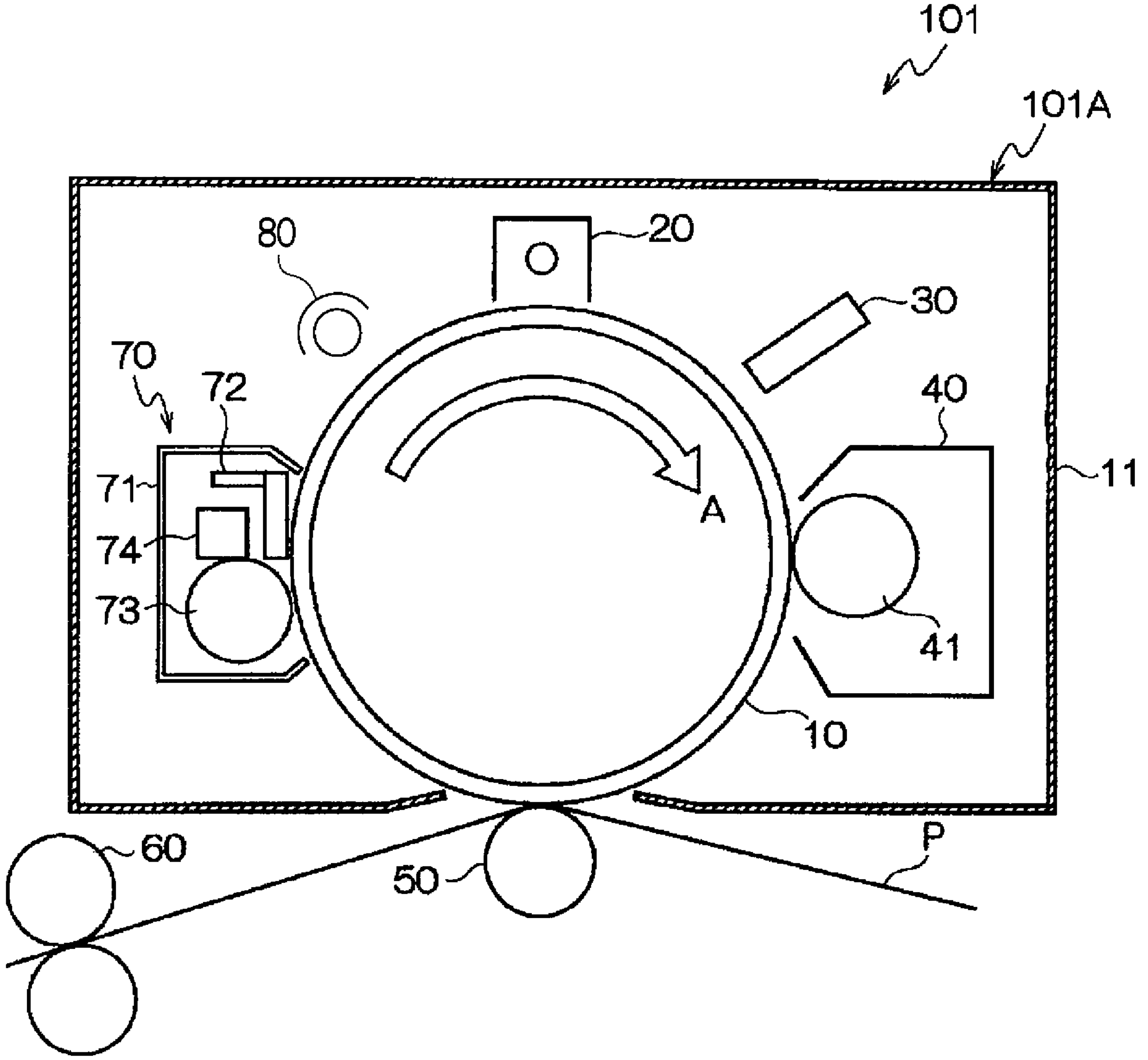
FIG. 3 is a schematic diagram illustrating an image forming apparatus according to another exemplary embodiment.

The image forming apparatus 101 according to the exemplary embodiment may have a structure including a process cartridge 101A in which an electrophotographic photoreceptor 10, a charging device 20, an exposure device 30, a developing device 40, a cleaning device 70, and an optical discharging device 80 are integrally housed in a housing 11, for example, as illustrated in FIG. 3. This process cartridge 101A integrally houses plural members and is attached to and detached from the image forming apparatus 101.

The configuration of the process cartridge 101A is not limited to this, and include, for example, at least the electrophotographic photoreceptor 10 and the optical discharging device 80 and may further include other devices, for example, at least one selected from the charging device 20, the exposure device 30, the developing device 40, the transfer device 50, and the cleaning device 70.

The image forming apparatus 101 according to the exemplary embodiment is not limited to the configurations described above and may have a structure in which a first discharging device that makes the polarity of the residual toner uniform to facilitate the removal with the cleaning brush is disposed, around the electrophotographic photoreceptor 10, downstream of the transfer device 50 in the rotation direction of the electrophotographic photoreceptor 10 and upstream of the cleaning device 70 in the rotation direction of the electrophotographic photoreceptor.

The image forming apparatus 101 according to the exemplary embodiment is not limited to the configurations described above, and a well-known configuration, for example, an intermediate transfer-type image forming apparatus, in which a toner image formed on the electrophotographic photoreceptor 10 is transferred onto an intermediate transfer body and then transferred onto a recording sheet P, or a tandem-system image forming apparatus may be employed.

EXAMPLES

Examples will be described below, but the present disclosure is not limited by the Examples. In the description below, all "part" and "%" are on a mass basis unless otherwise noted.

Production of Fluorine-Containing Resin Particles

Production of Fluorine-Containing Resin Particles (1)

Fluorine-containing resin particles (1) are produced as follows.

In an autoclave, 3 L of deionized water, 3.0 g of ammonium perfluorooctanoate, and 110 g of paraffin wax (manufactured by Nippon Oil Co., Ltd.) serving as an emulsifying stabilizer are charged, and the inside of the system is purged with nitrogen three times and with tetrafluoroethylene (TFE) twice to remove oxygen. Subsequently, the internal pressure is adjusted to 1.0 MPa with TFE, and the internal temperature is maintained at 70° C. while stirring at 250 rpm. Next, ethane, serving as a chain transfer agent, in an amount equivalent to 150 cc at normal pressure and 20 mL of an aqueous solution prepared by dissolving 300 mg of ammonium persulfate serving as a polymerization initiator are charged into the system to start a reaction. During the reaction, the temperature in the system is maintained at 70° C., and TFE is continuously supplied so as to constantly maintain the internal pressure of the autoclave to 1.0±0.05 MPa. When the amount of TFE consumed by the reaction after the addition of the initiator reaches 1,000 g, the supply of TFE and stirring are stopped to terminate the reaction. Subsequently, the particles are separated by centrifugal separation, 400 parts by mass of methanol are further taken, the resulting mixture is washed for 10 minutes with a stirrer at 250 rpm while ultrasonic waves are applied, and the supernatant is filtered. This operation is repeated three times, and the filtration residue is then dried at a reduced pressure at 60° C. for 17 hours.

Through the steps described above, fluorine-containing resin particles (1) are produced.

Production of Fluorine-Containing Resin Particles (2) to (5) and (C1)

Fluorine-containing resin particles (C1) are produced as follows.

In a barrier nylon bag, 100 parts by mass of a commercially available homo-polytetrafluoroethylene fine powder (standard specific gravity measured in accordance with ASTM D 4895 (2004): 2.175) and 2.4 parts by mass of ethanol serving as an additive are added and placed. Subsequently, cobalt-60γ rays are applied at a dose of 150 kGy in air at room temperature to obtain a low-molecular-weight polytetrafluoroethylene powder. The resulting powder is pulverized to obtain fluorine-containing resin particles (C1).

The types and amounts of the additives and the energy intensity of γ rays in the above production method are adjusted to obtain fluorine-containing resin particles (2) to (5) having the number of carboxy groups (represented as "number of COOH groups") and the PFOA content shown in Table 1.

Production of Photoreceptor

Photoreceptor (1)

A photoreceptor is produced as follows.

One hundred parts of zinc oxide (average particle diameter: 70 nm, manufactured by TAYCA CORPORATION, specific surface area value: 15 $m^2/g$) is mixed with 500 parts of tetrahydrofuran under stirring, 1.4 parts of a silane coupling agent (KBE503, manufactured by SHIN-ETSU CHEMICAL CO., LTD.) is added thereto, and the resulting mixture is stirred for two hours. Subsequently, tetrahydrofuran is distilled off by vacuum distillation, baking is performed at 120° C. for three hours, and consequently, zinc oxide having a surface treated with the silane coupling agent is obtained.

Next, 110 parts of the surface-treated zinc oxide is mixed with 500 parts of tetrahydrofuran under stirring, a solution prepared by dissolving 0.6 parts of alizarin in 50 parts of tetrahydrofuran is added to the resulting mixture, and the mixture is stirred at 50° C. for five hours. Subsequently, the resulting alizarin-added zinc oxide is separated by vacuum filtration and further dried at 60° C. under reduced pressure, and consequently, alizarin-added zinc oxide is obtained.

Sixty parts of the alizarin-added zinc oxide, 13.5 parts of a curing agent (blocked isocyanate, Sumidur 3175, manufactured by SUMIKA BAYER URETHANE CO., LTD.), 15 parts of a butyral resin (S-LEC BM-1, manufactured by SEKISUI CHEMICAL CO., LTD.), and 85 parts of methyl ethyl ketone are mixed to obtain a mixed liquid. Next, 38 parts of this mixed liquid and 25 parts of methyl ethyl ketone are mixed, and the resulting mixture is dispersed for two hours in a sand mill using glass beads having a diameter ϕ of 1 mm to obtain a dispersion.

To the obtained dispersion, 0.005 parts of dioctyltin dilaurate serving as a catalyst and 30 parts of silicone resin particles (Tospearl 145, manufactured by MOMENTIVE PERFORMANCE MATERIALS JAPAN LLC) are added to prepare a coating liquid for an undercoat layer. The coating liquid is applied to a cylindrical aluminum substrate by a dip coating method and dried and cured at 170° C. for 30 minutes, and consequently, an undercoat layer having a thickness of 24 μm is obtained.

Next, 1 part of hydroxygallium phthalocyanine having intense diffraction peaks at Bragg angles (2θ±0.2°) of 7.5°, 9.9°, 12.5°, 16.3°, 18.6°, 25.1°, and 28.3° in an X-ray diffraction spectrum is mixed with 1 part of polyvinyl butyral (S-LEC BM-5, manufactured by SEKISUI CHEMICAL CO., LTD.) and 80 parts of n-butyl acetate, and the resulting mixture is dispersed together with glass beads in a paint shaker for one hour to prepare a coating liquid for a charge generation layer. The obtained coating liquid is applied to the undercoat layer formed on the conductive substrate by a dip coating method and dried by heating at 130° C. for 10 minutes to form a charge generation layer having a thickness of 0.15 μm.

In 350 parts of toluene and 150 parts of tetrahydrofuran, a total of 100 parts of a benzidine compound represented by formula (CTM1) below and serving as a charge-transporting material and a polymer compound (viscosity-average molecular weight: 40,000) having a repeating unit represented by formula (PCZ1) below and serving as a binder resin are dissolved at a mass ratio of 41:59, 11.2 parts of the fluorine-containing resin particles (1) are added to the resulting solution, and the resulting mixture is treated five times with a high-pressure homogenizer to prepare a coating liquid for a charge transport layer.

The obtained coating liquid is applied to the charge generation layer by a dip coating method and heated at 130° C. for 45 minutes to form a charge transport layer having a thickness of 31 μm.

(CTM1)

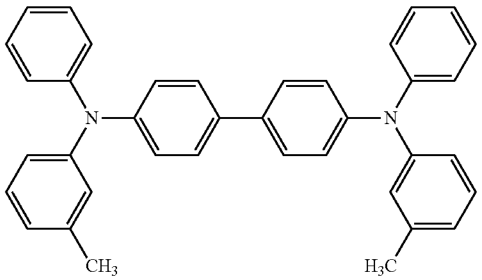

(PCZ1)

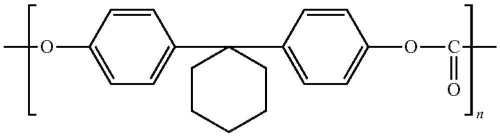

Through the steps described above, a photoreceptor (1) is produced.

Photoreceptors (2) to (5) and Photoreceptor C1

Photoreceptors (2) to (5) and a photoreceptor C1 are obtained as in the photoreceptor (1) except that the type of fluorine-containing resin particles and the mass ratio of the charge-transporting material to the binder resin are changed in accordance with Table 1.

Examples 1 to 28 and Comparative Examples 1 to 7

The obtained photoreceptors are attached to image forming apparatuses "DocuPrintCP500d" manufactured by FUJIFILM Business Innovation Corp. in accordance with Table 1. The light quantity of discharging light emitted from an optical discharging device of each of the image forming apparatuses is set to the light quantity shown in Table 1. Some of the image forming apparatuses are set so that the irradiation with discharging light from the optical discharging device is not performed (represented as "light quantity: 0 μW").

Each of these image forming apparatuses is used as an image forming apparatus in the corresponding Example, and the following evaluations are performed.

Evaluations

Wear Resistance

Wear resistance is evaluated as follows.

The thickness of the photosensitive layer is measured, and the measured value is defined as L1. Subsequently, the photoreceptor is mounted in the image forming apparatus. In an environment at a temperature of 20° C. and a humidity of 40% RH, continuous printing of 10,000 sheets is performed using a random character chart with an area coverage of 5%, the thickness of the photosensitive layer is then measured again, and the measured value is defined as L2. The difference between L1 and L2 is calculated as the absolute value of ΔL.

The thickness is measured with an eddy current thickness gauge. The evaluation criteria are as follows.

A: ΔL is 0.5 μm or less.

B: ΔL is more than 0.5 μm and 0.7 μm or less.

C: ΔL is more than 0.7 μm and 0.9 μm or less.

D: ΔL is more than 0.9 μm and 1.1 μm or less.

E: ΔL is more than 1.1 μm.

Chargeability

Chargeability is evaluated as follows.

The photoreceptor is mounted in a photoreceptor electrical property evaluation apparatus manufactured by FUJIFILM Business Innovation Corp. and including a charging device, an exposure device, and a discharging device. After one cycle of a series of steps of charging, exposure, and discharging is performed under the following conditions, charging is further performed, the charge potential of the photoreceptor surface is measured, and the measured value is defined as VH1. Subsequently, one cycle of the operation of the evaluation apparatus is carried out under the following conditions without performing the series of steps of charging, exposure, and discharging, the charge potential of the photoreceptor surface is measured, and the measured value is defined as VH2. The difference between VH1 and VH2 is calculated as the absolute value of ΔVH.

The charge potential of the photoreceptor surface is measured with a surface electrometer (Trek 334, manufactured by Trek Inc.) at a position 1 mm away from the photoreceptor surface.

Conditions

Measurement environment: temperature of 20° C./humidity of 40% RH

Charge potential: −400 V

Quantity of exposure light: 4 $mJ/m^2$

Exposure wavelength: 780 nm

Discharging light source: halogen lamp (manufactured by HAYASHI-REPIC CO., LTD.)

Discharging light wavelength: 600 nm or more and 800 nm or less

Quantity of discharging light: 30 $mJ/m^2$

Rotational speed of photoreceptor: 66.7 rpm

The evaluation criteria of the chargeability are as follows.

A: ΔVH is 5 V or less.

B: ΔVH is more than 5 V and 10 V or less.

C: ΔVH is more than 10 V and 15 V or less.

D: ΔVH is more than 15 V and 20 V or less.

E: ΔVH is more than 20 V.

Potential Retainability

The potential retainability is evaluated as follows.

The photoreceptor is mounted in a photoreceptor electrical property evaluation apparatus manufactured by FUJIFILM Business Innovation Corp. and including a charging device, an exposure device, and a discharging device. When one cycle of a series of steps of charging, exposure, and discharging is performed under the following conditions, the potential of the photoreceptor surface after exposure is measured, and the measured value is defined as VL1. Subsequently, 1000 cycles of the series of steps of charging, exposure, and discharging are performed by operating the evaluation apparatus, the potential of the photoreceptor surface after exposure at the 1000th cycle is measured, and the measured value is defined as VL2. The difference between VL1 and VL2 is calculated as the absolute value of ΔVL.

The charge potential of the photoreceptor surface is measured with a surface electrometer (Trek 334, manufactured by Trek Inc.) at a position 1 mm away from the photoreceptor surface.

Conditions

Measurement environment: temperature of 20° C./humidity of 40% RH

Charge potential: −400 V

Quantity of exposure light: 4 mJ/m $^{2}$

Exposure wavelength: 780 nm

Discharging light source: halogen lamp (manufactured by HAYASHI-REPIC CO., LTD.)

Discharging light wavelength: 600 nm or more and 800 nm or less

Quantity of discharging light: 30 mJ/m $^{2}$

Rotational speed of photoreceptor: 66.7 rpm

The evaluation criteria of the potential retainability are as follows.

A: ΔVL is 10 V or less.

B: ΔVL is more than 10 V and 15 V or less.

C: ΔVL is more than 15 V and 20 V or less.

D: ΔVL is more than 20 V and 30 V or less.

E: ΔVL is more than 30 V.

Image Density Retainability

The image density retainability is evaluated as follows.

The photoreceptor is mounted in the image forming apparatus. In an environment at a temperature of 20° C. and a humidity of 40% RH, a 50% halftone image is output, the density is measured, and the measured value is defined as A1. Subsequently, continuous printing of 5,000 sheets is performed using a random character chart with an area coverage of 5%, the 50% halftone image is then output again, the density is measured, and the measured value is defined as A2. The difference between A1 and A2 is calculated as the absolute value of ΔA.

The density is measured with a spectrodensitometer (X-Rite 500, manufactured by X-Rite Inc.). The evaluation criteria are as follows.

A: ΔA is 0.10 or less.

B: ΔA is more than 0.10 and 0.15 or less.

C: ΔA is more than 0.15 and 0.20 or less.

D: ΔA is more than 0.20 and 0.30 or less.

E: ΔA is more than 0.30.

TABLE 1

| | | Fluorine-containing resin particles | | | | | Evaluation | | | |
|---|---|---|---|---|---|---|---|---|---|---|
| | Type of photo-receptor | Type | Number of COOH groups (groups) | PFOA content (ppb) | Charge-transporting material:Binder resin Ratio | Optical discharging device Light quantity (μW) | Wear resistance | Charge-ability | Potential retain-ability | Image density retain-ability |
| Example 1 | 1 | 1 | 0 | 0 | 41:59 | 1 | A | A | A | B |
| Example 2 | | | | | | 5 | A | A | A | A |
| Example 3 | | | | | | 20 | A | A | A | A |
| Example 4 | | | | | | 30 | A | A | A | A |
| Example 5 | | | | | | 50 | A | A | B | B |
| Example 6 | 2 | 2 | 30 | 25 | 41:59 | 1 | A | C | A | B |
| Example 7 | | | | | | 5 | A | C | A | A |
| Example 8 | | | | | | 20 | A | C | A | A |
| Example 9 | | | | | | 30 | A | C | A | A |
| Example 10 | | | | | | 50 | A | C | B | B |
| Example 11 | 3 | 3 | 20 | 20 | 41:59 | 1 | A | B | A | B |
| Example 12 | | | | | | 5 | A | B | A | A |
| Example 13 | | | | | | 20 | A | B | A | A |
| Example 14 | | | | | | 30 | A | B | A | A |
| Example 15 | | | | | | 50 | A | B | B | B |
| Example 16 | 4 | 4 | 40 | 0 | 41:59 | 1 | A | D | A | B |
| Example 17 | | | | | | 5 | A | D | A | A |
| Example 18 | | | | | | 20 | A | D | A | A |
| Example 19 | | | | | | 30 | A | D | A | A |
| Example 20 | | | | | | 50 | A | D | B | B |
| Example 21 | 5 | 5 | 0 | 40 | 41:59 | 1 | A | D | A | B |
| Example 22 | | | | | | 5 | A | D | A | A |
| Example 23 | | | | | | 20 | A | D | A | A |
| Example 24 | | | | | | 30 | A | D | A | A |
| Example 25 | | | | | | 50 | A | D | B | B |
| Example 26 | 1 | 1 | 0 | 0 | 39:61 | 20 | A | A | D | C |
| Example 27 | | | | | 40:60 | 20 | A | A | C | B |
| Example 28 | | | | | 42:58 | 20 | A | A | A | A |
| Comparative Example 1 | 1 | 1 | 0 | 0 | 41:59 | 0 | A | A | A | E |
| Comparative Example 2 | | | | | | 60 | A | A | E | A |
| Comparative Example 3 | 2 | 2 | 30 | 25 | 41:59 | 0 | A | E | A | E |
| Comparative Example 4 | | | | | | 60 | A | E | E | A |
| Comparative Example 5 | C1 | C1 | 40 | 40 | 41:59 | 1 | A | E | A | B |
| Comparative Example 6 | | | | | | 20 | A | E | A | A |
| Comparative Example 7 | | | | | | 50 | A | E | B | B |

The above results show that the photoreceptors of Examples have good potential retainability and image density retainability compared with the photoreceptors of Comparative Examples.

It is also found that in Comparative Examples in which fluorine-containing resin particles having a large number of carboxy groups and a high PFOA content are used, chargeability is low.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

Appendix (((1)))

An image forming apparatus comprising:

an electrophotographic photoreceptor that includes a conductive substrate and a photosensitive layer disposed on the conductive substrate, the electrophotographic photoreceptor having an outermost surface layer that contains a binder resin, a charge-transporting material, and a fluorine-containing resin particle, the fluorine-containing resin particle containing 0 or more and 30 or less carboxy groups per $10^6$ carbon atoms;

a charging device that charges the electrophotographic photoreceptor;

an electrostatic latent image forming device that forms an electrostatic latent image on the electrophotographic photoreceptor that is charged;

a developing device that houses a developer containing a toner and that develops, with the developer, the electrostatic latent image formed on the electrophotographic photoreceptor into a toner image;

a transfer device that transfers the toner image onto a transfer-receiving medium; and an optical discharging device that, after the toner image is transferred onto the transfer-receiving medium and before the electrophotographic photoreceptor is charged, irradiates the electrophotographic photoreceptor with discharging light with a light quantity of 1.0 μW or more and 50.0 μW or less to perform discharging.

(((2)))

The image forming apparatus according to (((1))), wherein the fluorine-containing resin particle contains 0 or more and 20 or less carboxy groups per $10^6$ carbon atoms.

(((3)))

The image forming apparatus according to (((1))) or (((2))), wherein the light quantity of the discharging light is 5.0 μW or more and 30.0 μW or less.

(((4)))

The image forming apparatus according to any one of (((1))) to (((3))), wherein a mass ratio of the charge-transporting material to the binder resin (charge-transporting material/binder resin) is 40/60 or more and 42/58 or less.

(((5)))

An image forming apparatus comprising:

an electrophotographic photoreceptor that includes a conductive substrate and a photosensitive layer disposed on the conductive substrate, the electrophotographic photoreceptor having an outermost surface layer that contains a binder resin, a charge-transporting material, and a fluorine-containing resin particle, the fluorine-containing resin particle containing perfluorooctanoic acid in an amount of 0 ppb or more and 25 ppb or less relative to the fluorine-containing resin particle;

a charging device that charges the electrophotographic photoreceptor;

an electrostatic latent image forming device that forms an electrostatic latent image on the electrophotographic photoreceptor that is charged;

a developing device that houses a developer containing a toner and that develops, with the developer, the electrostatic latent image formed on the electrophotographic photoreceptor into a toner image;

a transfer device that transfers the toner image onto a transfer-receiving medium; and an optical discharging device that, after the toner image is transferred onto the transfer-receiving medium and before the electrophotographic photoreceptor is charged, irradiates the electrophotographic photoreceptor with discharging light with a light quantity of 1.0 μW or more and 50.0 μW or less to perform discharging.

(((6)))

The image forming apparatus according to (((5))), wherein the fluorine-containing resin particle contains perfluorooctanoic acid in an amount of 0 ppb or more and 20 ppb or less relative to the fluorine-containing resin particle.

(((7)))

The image forming apparatus according to (((5))) or (((6))), wherein the light quantity of the discharging light is 5.0 μW or more and 30.0 μW or less.

(((8)))

The image forming apparatus according to any one of (((5))) to (((7))), wherein a mass ratio of the charge-transporting material to the binder resin (charge-transporting material/binder resin) is 40/60 or more and 42/58 or less.

(((9)))

A process cartridge comprising:

an electrophotographic photoreceptor that includes a conductive substrate and a photosensitive layer disposed on the conductive substrate, the electrophotographic photoreceptor having an outermost surface layer that contains a binder resin, a charge-transporting material, and a fluorine-containing resin particle, the fluorine-containing resin particle containing 0 or more and 30 or less carboxy groups per $10^6$ carbon atoms; and an optical discharging device that, after a toner image is transferred onto a transfer-receiving medium and before the electrophotographic photoreceptor is charged, irradiates the electrophotographic photoreceptor with discharging light with a light quantity of 1.0 μW or more and 50.0 μW or less to perform discharging, wherein the process cartridge is attached to and detached from the image forming apparatus according to any one of (((1))) to (((4))).

(((10)))

A process cartridge comprising:

an electrophotographic photoreceptor that includes a conductive substrate and a photosensitive layer disposed on the conductive substrate, the electrophotographic photoreceptor having an outermost surface layer that contains a binder resin, a charge-transporting material, and a fluorine-containing resin particle, the fluorine-containing resin particle containing perfluorooctanoic acid in an amount of 0 ppb or more and 25 ppb or less relative to the fluorine-containing resin particle; and an optical discharging device that, after a toner image is transferred onto a transfer-receiving medium and before the electrophotographic photoreceptor is charged, irradiates the electrophotographic photoreceptor with discharging light with a light quantity of 1.0 μW or more and 50.0 μW or less to perform discharging, wherein the process cartridge is attached to and detached from the image forming apparatus according to any one of (((5))) to (((8))).

What is claimed is:

1. An image forming apparatus comprising:

an electrophotographic photoreceptor that includes a conductive substrate and a photosensitive layer disposed on the conductive substrate, the electrophotographic photoreceptor having an outermost surface layer that contains a binder resin, a charge-transporting material, and a fluorine-containing resin particle, the fluorine-containing resin particle containing 0 or more and 30 or less carboxy groups per $10^6$ carbon atoms;

a charging device that charges the electrophotographic photoreceptor;

an electrostatic latent image forming device that forms an electrostatic latent image on the electrophotographic photoreceptor that is charged;

a developing device that houses a developer containing a toner and that develops, with the developer, the electrostatic latent image formed on the electrophotographic photoreceptor into a toner image;

a transfer device that transfers the toner image onto a transfer-receiving medium; and an optical discharging device that, after the toner image is transferred onto the transfer-receiving medium and before the electrophotographic photoreceptor is charged, irradiates the electrophotographic photoreceptor with discharging light with a light quantity of 1.0 μW or more and 50.0 μW or less to perform discharging.

2. The image forming apparatus according to claim 1, wherein the fluorine-containing resin particle contains 0 or more and 20 or less carboxy groups per $10^6$ carbon atoms.

3. The image forming apparatus according to claim 1, wherein the light quantity of the discharging light is 5.0 μW or more and 30.0 μW or less.

4. The image forming apparatus according to claim 1, wherein a mass ratio of the charge-transporting material to the binder resin (charge-transporting material/binder resin) is 40/60 or more and 42/58 or less.

5. An image forming apparatus comprising:

an electrophotographic photoreceptor that includes a conductive substrate and a photosensitive layer disposed on the conductive substrate, the electrophotographic photoreceptor having an outermost surface layer that contains a binder resin, a charge-transporting material, and a fluorine-containing resin particle, the fluorine-containing resin particle containing perfluorooctanoic acid in an amount of 0 ppb or more and 25 ppb or less relative to the fluorine-containing resin particle;

a charging device that charges the electrophotographic photoreceptor;

an electrostatic latent image forming device that forms an electrostatic latent image on the electrophotographic photoreceptor that is charged;

a developing device that houses a developer containing a toner and that develops, with the developer, the electrostatic latent image formed on the electrophotographic photoreceptor into a toner image;

a transfer device that transfers the toner image onto a transfer-receiving medium; and an optical discharging device that, after the toner image is transferred onto the transfer-receiving medium and before the electrophotographic photoreceptor is charged, irradiates the electrophotographic photoreceptor with discharging light with a light quantity of 1.0 μW or more and 50.0 μW or less to perform discharging.

6. The image forming apparatus according to claim 5, wherein the fluorine-containing resin particle contains perfluorooctanoic acid in an amount of 0 ppb or more and 20 ppb or less relative to the fluorine-containing resin particle.

7. The image forming apparatus according to claim 5, wherein the light quantity of the discharging light is 5.0 μW or more and 30.0 μW or less.

8. The image forming apparatus according to claim 5, wherein a mass ratio of the charge-transporting material to the binder resin (charge-transporting material/binder resin) is 40/60 or more and 42/58 or less.

9. A process cartridge comprising:

an electrophotographic photoreceptor that includes a conductive substrate and a photosensitive layer disposed on the conductive substrate, the electrophotographic photoreceptor having an outermost surface layer that contains a binder resin, a charge-transporting material, and a fluorine-containing resin particle, the fluorine-containing resin particle containing 0 or more and 30 or less carboxy groups per $10^6$ carbon atoms; and an optical discharging device that, after a toner image is transferred onto a transfer-receiving medium and before the electrophotographic photoreceptor is charged, irradiates the electrophotographic photoreceptor with discharging light with a light quantity of 1.0 μW or more and 50.0 μW or less to perform discharging, wherein the process cartridge is attached to and detached from the image forming apparatus according to claim 1.

10. A process cartridge comprising:

an electrophotographic photoreceptor that includes a conductive substrate and a photosensitive layer disposed on the conductive substrate, the electrophotographic photoreceptor having an outermost surface layer that contains a binder resin, a charge-transporting material, and a fluorine-containing resin particle, the fluorine-containing resin particle containing perfluorooctanoic acid in an amount of 0 ppb or more and 25 ppb or less relative to the fluorine-containing resin particle; and an optical discharging device that, after a toner image is transferred onto a transfer-receiving medium and before the electrophotographic photoreceptor is charged, irradiates the electrophotographic photoreceptor with discharging light with a light quantity of 1.0 μW or more and 50.0 μW or less to perform discharging, wherein the process cartridge is attached to and detached from the image forming apparatus according to claim 5.

* * * * *